(12) United States Patent
DeVera et al.

(10) Patent No.: US 9,249,028 B2
(45) Date of Patent: Feb. 2, 2016

(54) METHOD FOR MAKING HIGH PURITY METAL OXIDE PARTICLES AND MATERIALS MADE THEREOF

(75) Inventors: Antonio L. DeVera, Avon Lake, OH (US); Martin Panchula, Eastlake, OH (US)

(73) Assignee: MOMENTIVE PERFORMANCE MATERIALS INC., Waterford, NY (US)

(*) Notice: Subject to any disclaimer, the term of this patent is extended or adjusted under 35 U.S.C. 154(b) by 379 days.

(21) Appl. No.: 13/560,516

(22) Filed: Jul. 27, 2012

(65) Prior Publication Data
US 2012/0288714 A1 Nov. 15, 2012

Related U.S. Application Data

(63) Continuation-in-part of application No. 13/455,824, filed on Apr. 25, 2012, which is a continuation of application No. 12/701,862, filed on Feb. 8, 2010, now Pat. No. 8,197,782.

(60) Provisional application No. 61/513,278, filed on Jul. 29, 2011.

(51) Int. Cl.
*B01J 19/00* (2006.01)
*C01F 11/18* (2006.01)
(Continued)

(52) U.S. Cl.
CPC ............ *C01B 33/12* (2013.01); *C01B 13/326* (2013.01); *C01B 13/363* (2013.01); *C01B 33/18* (2013.01);
(Continued)

(58) Field of Classification Search
CPC ............ Y10S 977/773; Y10S 977/775; Y10S 977/777; C01P 2004/03; C01P 2004/64; C01P 2006/22; C01P 2004/52; B82Y 30/00; C01G 1/02

See application file for complete search history.

(56) References Cited

U.S. PATENT DOCUMENTS

| 4,317,668 A | 3/1982 | Susa et al. |
| 4,767,433 A | 8/1988 | Iura et al. |

(Continued)

FOREIGN PATENT DOCUMENTS

| EP | 0363927 | 4/1990 |
| EP | 0 823 403 | 7/2003 |

(Continued)

OTHER PUBLICATIONS

International Search Report and Written Opinion for PCT/US2012/048589 dated Oct. 10, 2012.
(Continued)

*Primary Examiner* — Stanley Silverman
*Assistant Examiner* — Syed Iqbal
(74) *Attorney, Agent, or Firm* — Joseph E. Waters, Esq.; McDonald Hopkins LLC

(57) ABSTRACT

The present invention is directed to a method of making metal oxide and mixed metal oxide particles. The method includes treating a mixture formed from a metal source, such as metal alkoxide, a surfactant, and a first alcohol in an aqueous media at a very high metal oxide yield. The mixture is reacted using a catalyst to form metal oxide particles having a desired particle size in said mixture. By washing the particles with an aprotic solvent, the residual carbon content of the particles can be significantly reduced. The method is particularly suitable for forming silica particles. The metal oxide particles can then be heat treated to form synthetic fused metal oxides such as, for example, synthetic fused silica.

26 Claims, 15 Drawing Sheets

(51) Int. Cl.
  *C01G 1/02* (2006.01)
  *C01B 33/12* (2006.01)
  *C01B 13/32* (2006.01)
  *C01B 13/36* (2006.01)
  *C01B 33/18* (2006.01)
  *C01B 33/187* (2006.01)

(52) U.S. Cl.
  CPC ........... *C01B 33/187* (2013.01); *C01P 2004/02* (2013.01); *C01P 2004/03* (2013.01); *C01P 2004/61* (2013.01); *Y10T 428/2982* (2015.01)

(56) References Cited

U.S. PATENT DOCUMENTS

| | | | |
|---|---|---|---|
| 4,937,208 A | 6/1990 | Yamamoto | |
| 4,940,571 A | 7/1990 | Su et al. | |
| 4,943,425 A | 7/1990 | Su et al. | |
| 4,943,542 A | 7/1990 | Hayashi et al. | |
| 4,946,805 A | 8/1990 | Shaw | |
| 4,979,973 A | 12/1990 | Takita et al. | |
| 4,981,819 A | 1/1991 | Rinn et al. | |
| 4,983,369 A | 1/1991 | Barder et al. | |
| 5,008,219 A | 4/1991 | Hara | |
| 5,011,669 A | 4/1991 | Tsuchiya et al. | |
| 5,017,354 A | 5/1991 | Simms et al. | |
| 5,019,146 A | 5/1991 | Hara | |
| 5,021,073 A | 6/1991 | Takita et al. | |
| 5,028,247 A | 7/1991 | Asami et al. | |
| 5,030,433 A | 7/1991 | Mehrotra | |
| 5,063,179 A | 11/1991 | Menashi et al. | |
| 5,145,510 A | 9/1992 | Saito et al. | |
| 5,186,745 A | 2/1993 | Maniar | |
| 5,202,104 A | 4/1993 | Watanabe et al. | |
| 5,207,814 A | 5/1993 | Cogliati et al. | |
| 5,211,733 A | 5/1993 | Fukao et al. | |
| 5,256,386 A | 10/1993 | Nystrom et al. | |
| 5,304,364 A | 4/1994 | Costa et al. | |
| 5,312,613 A | 5/1994 | Shyu et al. | |
| 5,328,645 A | 7/1994 | Lin et al. | |
| 5,372,796 A | 12/1994 | Wellinghoff | |
| 5,395,604 A | 3/1995 | Harris et al. | |
| 5,425,930 A | 6/1995 | Anderson | |
| 5,480,582 A | 1/1996 | Pope | |
| 5,484,869 A * | 1/1996 | Panster et al. | 528/18 |
| 5,516,350 A | 5/1996 | Onoda et al. | |
| 5,558,849 A | 9/1996 | Sharp | |
| 5,604,163 A | 2/1997 | Endo et al. | |
| 5,637,507 A | 6/1997 | Wicks et al. | |
| 5,656,250 A | 8/1997 | Tanaka et al. | |
| 5,665,133 A | 9/1997 | Orii et al. | |
| 5,718,907 A | 2/1998 | Labarre | |
| 5,800,606 A | 9/1998 | Tanaka et al. | |
| 5,837,025 A | 11/1998 | Auchter-Krummel et al. | |
| 5,871,558 A | 2/1999 | Takei et al. | |
| 5,879,649 A | 3/1999 | Henderson et al. | |
| 5,944,966 A | 8/1999 | Suetsugu et al. | |
| 5,979,186 A | 11/1999 | Koppler et al. | |
| 6,071,838 A | 6/2000 | Endo et al. | |
| 6,103,209 A | 8/2000 | Balducci et al. | |
| 6,110,852 A | 8/2000 | Katsuro et al. | |
| 6,129,899 A | 10/2000 | Katsuro et al. | |
| 6,131,409 A | 10/2000 | Katsuro et al. | |
| 6,191,824 B1 | 2/2001 | Ogawa | |
| 6,225,245 B1 | 5/2001 | Utsunomiya et al. | |
| 6,296,826 B1 | 10/2001 | Fujinoki et al. | |
| 6,360,564 B1 | 3/2002 | Cornelius et al. | |
| 6,408,648 B1 | 6/2002 | Morizane | |
| 6,426,371 B1 | 7/2002 | Li et al. | |
| 6,432,151 B1 | 8/2002 | So et al. | |
| 6,437,007 B1 | 8/2002 | Smith et al. | |
| 6,645,908 B1 | 11/2003 | Sigman et al. | |
| 6,652,612 B2 | 11/2003 | Nakashima et al. | |
| 6,826,927 B2 | 12/2004 | Fukui et al. | |
| 6,838,068 B2 | 1/2005 | Katsuro et al. | |
| 6,849,242 B1 | 2/2005 | Koeppler et al. | |
| 7,063,826 B2 | 6/2006 | Katsuro et al. | |
| 7,074,376 B2 | 7/2006 | Katsuro et al. | |
| 7,101,523 B2 | 9/2006 | Mori et al. | |
| 7,232,556 B2 * | 6/2007 | Yadav | 423/592.1 |
| 7,238,331 B2 | 7/2007 | Zhou et al. | |
| 7,312,170 B2 | 12/2007 | Nishimura et al. | |
| 7,427,387 B2 | 9/2008 | Katsuro et al. | |
| 7,452,518 B2 | 11/2008 | Hansen et al. | |
| 7,506,521 B2 | 3/2009 | Bookbinder et al. | |
| 7,514,382 B2 | 4/2009 | Ikuta et al. | |
| 7,534,733 B2 | 5/2009 | Bookbinder et al. | |
| 7,589,039 B2 | 9/2009 | Allan et al. | |
| 7,731,110 B2 | 6/2010 | Huang | |
| 7,736,613 B2 | 6/2010 | Fukui et al. | |
| 8,034,740 B2 | 10/2011 | Kitahata et al. | |
| 2003/0069347 A1 | 4/2003 | Oishi et al. | |
| 2003/0157011 A1 | 8/2003 | Mori | |
| 2004/0056376 A1 | 3/2004 | Coronado | |
| 2004/0091411 A1 | 5/2004 | Modrek-Najafabadi | |
| 2004/0253170 A1 * | 12/2004 | Zhou et al. | 423/592.1 |
| 2004/0254279 A1 | 12/2004 | Orchison et al. | |
| 2006/0079387 A1 | 4/2006 | Costa et al. | |
| 2006/0099130 A1 | 5/2006 | Roque-Malherbe et al. | |
| 2006/0150676 A1 | 7/2006 | Kim et al. | |
| 2006/0150860 A1 | 7/2006 | Nozaki | |
| 2007/0237701 A1 | 10/2007 | Yamakawa et al. | |
| 2008/0025900 A1 | 1/2008 | Mori | |
| 2008/0070146 A1 | 3/2008 | Fomitchev et al. | |
| 2008/0170979 A1 | 7/2008 | Wang et al. | |
| 2008/0206562 A1 | 8/2008 | Stucky et al. | |
| 2008/0241044 A1 | 10/2008 | Kuebelbeck | |
| 2008/0311397 A1 | 12/2008 | Tatsumi et al. | |
| 2010/0003182 A1 | 1/2010 | Costa et al. | |
| 2010/0003204 A1 | 1/2010 | Loy et al. | |
| 2011/0065948 A1 | 3/2011 | Cromer et al. | |

FOREIGN PATENT DOCUMENTS

| | | |
|---|---|---|
| EP | 2514718 | 10/2012 |
| WO | 2006011252 | 2/2006 |
| WO | 2008015943 | 2/2008 |
| WO | 2008072637 | 6/2008 |

OTHER PUBLICATIONS

Arriagada, F.J. and Osseo-Asare, K., Synthesis of Nanosize Silica in Aerosol OT Reverse Microemulsions, Journal of Colloid and Interface Science (1995) 170, 8-17, Acedemic Press, Inc.

Gonzalez-Oliver, M. Schneider, Porous Silicate Beads by Gelation, Journal of Non-Crystalline Solids 100 (1988) 274-277, North-Holland, Amsterdam, Elsevier Science Publishers B.V. (North Holland Physics Publishing Division).

Extended European Search Report for European Application No. 12855712.1 dated Mar. 23, 2015.

Office Action for Chinese Application No. 201280037556.7 dated Feb. 27, 2015.

Chinese Office Action for Chinese Patent Application No. 201280037556, dated Nov. 10, 2015.

* cited by examiner

METHOD FOR MAKING HIGH PURITY METAL OXIDE PARTICLES AND MATERIALS MADE THEREOF

CROSS REFERENCE TO RELATED APPLICATIONS

The present application claims priority to U.S. Provisional Application No. 61/513,278 filed Jul. 29, 2011, which is incorporated herein by reference in its entirety. The present application also claims priority as a continuation-in-part of U.S. patent application Ser. No. 13/455,824 filed Apr. 25, 2012, which is a continuation of U.S. patent application Ser. No. 12/701,862, filed Feb. 8, 2010, now U.S. Pat. No. 8,197,782, each of which is incorporated herein by reference in its entirety.

FIELD OF INVENTION

The disclosed technology relates to a method of making and treating particles of metal oxides and the production of materials made therefrom, and finds particular applicability in the synthesis of high purity synthetic silica particles for bubble free fused synthetic silica materials.

BACKGROUND OF THE INVENTION

Metal and mixed metal oxides are useful as functional materials to provide heat resistance/conduction, as structural materials, composite membranes for fuel cells, solar cells, catalysts, controlled delivery, coatings, light diffusers, cosmetics, ceramic glasses, etc., wherein the particle size and morphology such as shape, internal porosity, and surface area may be important. Included among the metals used in such compounds are tetravalent metals such as zirconium, vanadium, titanium, and silicon, although lower valence metals such as aluminum or yttrium are also particularly useful. Because of its relative abundance, silicon oxides have been the material of choice for a wide variety of commercial usages from nanoparticles used in polymer composites to synthetic silica for production of ultrahigh purity fused quartz materials for semiconductor applications.

Controlled particle size, surface area, and porosity have been a matter of interest in recent years due to wide commercial applications. Current techniques for producing metal oxides, however, have a number of limitations and do not offer a single chemistry for providing a wide range of properties.

More specifically, for silicon metal and its corresponding silicon dioxide (silica), current techniques for synthesis of synthetic silica powder are based on sol-gel methods, ion-exchange of sodium silicate glass, and sol-gel of fumed silica derived from silicon tetrachloride or other oxidizable silicon source i.e. octamethylcyclotetrasiloxane in the presence of oxygen and/or water. Commercially available synthetic silica glass is primarily made utilizing; (1) a method in which a fume generated by decomposition of silicon tetrachloride or an organosilicon material in an oxyhydrogen flame is deposited and grown on a substrate; (2) a method in which a silica gel obtained by hydrolysis and gellation of a silicon alkoxide, is baked and a synthetic silica powder thereby obtained is further densified to make a glass; or (3) direct sol-gel processing usually used for smaller parts.

However, the method (1) has a problem in that the production cost is extremely high. On the other hand, in the method (2) employing a silica gel, particularly a silica gel derived from a silicon alkoxide, it is possible to obtain a synthetic silica powder having relatively low content of minor impurities, but the desired impurity level is not necessarily satisfied. Method 3 requires slow and extensive drying to produce parts without cracking and has not been found economically viable to this point for large shapes.

Silica sol has been conventionally made by using a sodium silicate solution called water glass as a starting material. In this way, sodium silicate solution is treated using a cation-exchange resin so that ions, such as sodium ion in sodium silicate, are removed in order to increase the purity of the starting material. Then, the resultant material is used for producing silica sol. Such a technique is disclosed in U.S. Publication No. 2007/0237701, which is incorporated by reference. However, because the above-method employs an ion-exchange resin for purification, its purity is limited to some degree. Thus, it is difficult to produce silica sol having 1 ppm or lower content of metal impurities, such as alkali metals (e.g., sodium), copper, nickel, and/or aluminum, which is required for use with electronic materials.

Alternatively, methods for making relatively high purity synthetic silica particles include hydrolyzing and condensing alkoxysilanes and using pulverization techniques. An example of a method using pulverization techniques for preparation of silica particles useful for high purity synthetic silica applications is disclosed in U.S. Pat. No. 6,131,409, which is incorporated by reference. Because of restrictions with respect to the purity of the starting material and the many process steps required to achieve the final particle size, various other processes have been attempted.

These methods and techniques, however, also have a number of limitations. For example, they do not appear to produce very high yields of silica. Also, as disclosed in U.S. Pat. No. 4,767,433, these methods and techniques do not form silica having a desired particle size, such as the particle size of 200 to 300 microns required by some fusion processes. These relatively larger particle size ranges also would be useful in the production of crucibles for semiconductor and glass articles useful to semiconductor processing such as, for example, racks, windows and containments, and fiber optics.

SUMMARY OF THE INVENTION

The present invention provides a method of making high purity metal oxide, metal hydroxide, metal oxhydroxide, metal carbonate, and/or metal oxynitride particles. In one embodiment, the method is particularly suitable for making synthetic silica. The method includes treating a mixture formed from a water suspension containing a metal source, a surfactant system, and a phase enhancer. The mixture is reacted with a catalyst to form metal oxide particles having a desired size without gelling of said mixture at high solids content.

More specifically, the present invention provides, in one aspect, a method for making particles comprising forming a first phase comprising a mixture of water, a metal source, a first catalyst, a first surfactant, and a first alcohol; adding the first phase to a second phase comprising water, a second alcohol, and a second surfactant to form a blend; treating the blend with a measured amount of a phase enhancer; and reacting the blend with a second catalyst to form particles.

In one aspect, the particles are condensed to metal oxide particles with a base catalyst to form particles of a desired size without gelling of the suspension.

Applicants have found that the use of slightly polar alcohols, such as, for example, butanol and the like as phase enhancers prevents excessive particle agglomeration during the addition of the second catalyst and further curing. The amount and type of phase enhancer(s) can be used to control the rate and degree of particle agglomeration. For example, it has been found that less phase enhancer can cause gelling of the entire reaction mass.

In another aspect, the present invention provides methods of treating metal oxide, metal hydroxide, metal carbonate particles, etc. to provide particles having a low concentration of residual organics and hydrocarbon material. Applicants have found the subjecting the particles to wash treatments with an aprotic solvent can significantly reduce the amount of residual (inorganic) carbon in the particles. Providing silica particles with low residual carbon prior to calcining provides silica particles that will improve the bubble quality of fused quartz made therefrom.

In one aspect, the present invention provides a method for producing porous metal oxide, metal hydroxide, metal carbonate, or metal oxalate particles, the method comprising: forming metal oxide, hydroxide, carbonate, sulfate, or oxolate particles from an alkoxide or organometallic material; and removing residual organic materials in the particles by treating the particles with water, at least one aprotic solvent, or a combination thereof via stripping, washing, or a combination thereof.

In another aspect, the present invention provides a method for making high purity synthetic silica comprising: (i) forming a first phase comprising a mixture of water, a silica source, a first catalyst, a first surfactant, and a first alcohol; (ii) adding the first phase to a second phase comprising water, a second alcohol, and a second surfactant to form a blend; (iii) treating the blend with a measured amount of a phase enhancer; (iv) treating the blend with a second catalyst to form silica particles; and (v) treating the silica particles from (iv) by stripping, washing; or a combination thereof, the treating of operation of (v) using water, an aprotic solvent, or a combination thereof.

The present invention also provides metal particles formed by such processes. In one embodiment, the particles can have a residual carbon content of 0.001 wt. % to about 1 wt. %.; about 0.01 wt. % to about 0.5 wt. %.; even about 0.05 wt. % to about 0.25 wt. %.

In one embodiment, the particles can have a particle size distribution such that 90% of the particle size distribution is between 1 and 1,500 μm; 90% of the particle size distribution is between 50 and 750 μm; 90% of the particle size distribution is between 75 and 500 μm.

In still another embodiment, the particles have a surface area of 5 to 1,300 $m^2/g$; 350 to 900 $m^2/g$; even 450 to 700 $m^2/g$.

In another embodiment, the particles have a metal impurity of about 100 ppb or less for each metal element impurity; about 50 ppb or less for each metal element impurity; about 10 ppb or less for each metal element impurity; about 5 ppb or less for each metal element impurity; even about 3 ppb or less for each metal element impurity.

In another embodiment, the particles have a residual hydrocarbon content as determined by Acetonitrile extraction and GC-MS analysis of 1,000 ppm or less, even 1 ppm or less.

In still another embodiment, the particles can be densified and sintered to a bubble free puck without an intermediate calcination step.

In another aspect, the present invention provides glass articles formed from silica particles formed in accordance with aspects of the present invention. In one embodiment, the silica particles have an OH concentration of about 5 ppm or less; about 2 ppm or less; even about 1 ppm or less.

DETAILED DESCRIPTION

Figure 1:
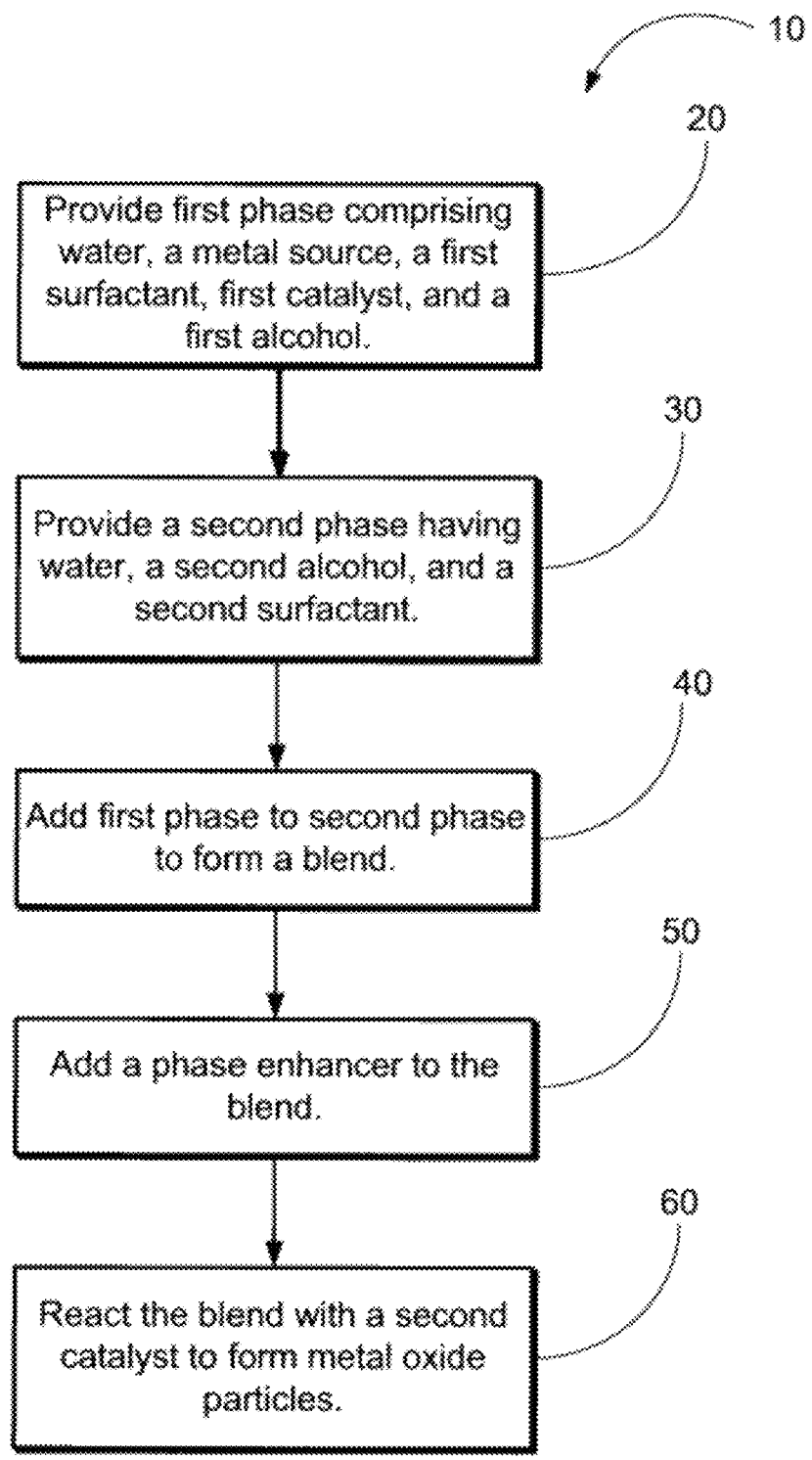
FIG. 1 shows a flowchart illustrating a method for making high purity metal oxide particles.

The present method is directed to generating a high yield of high purity synthetic metal particles, e.g., metal oxides, metal hydroxides, metal carbonates, metal oxycarbonates, metal hydroxycarbonates, methylated metal oxides, metal sulfates, etc., for use in various applications. In one embodiment, the method is used to form synthetic silica particles that may be used in the production of fused synthetic silica products. Non-limiting examples of other metal oxides that can be formed from the present method include, for example, $TiO_2$, $Fe_2O_3$, $SiO_2$, $Al_2O_3$, $ZrO_2$, $Nb_2O_3$, $Y_2O_3$, rare earth oxides, molecular mixtures and compounds thereof, and composite and decorated structures thereof. While the method and invention are described with respect to metal oxides such as silica, it will be appreciated that the methods can be applied to other metal particles including, but not limited to, metal hydroxides, metal carbonates, metal oxycarbonates, metal hydroxycarbonates, methylated metal oxides, sulfates, etc., and the term "metal particles" shall encompass all such particles. For convenience, the following description may recite or refer to the specific embodiment where the particles being synthesized are silica particles and the materials used in the inventive process and generated therefrom are thus specific to this embodiment. However, the general process will be similar for the synthesis of all metal particles, and thus these descriptions and process steps should be considered as applying in a general sense to any metal particle made from the present process, with only the corresponding raw materials and products as the significant differences.

The present method is capable of forming high purity synthetic particles having a particle size in a desired range. In this method, controlling synthetic particle growth to a desired size can be accomplished by controlling at least one of following properties: particle reactor pH; temperature of the particle reactor; molecular weight of the nonionic surfactant; concentration and rate of addition of the base catalyst to the particle reactor; the type and amount of phase enhancer; and/or temperature during acid hydrolysis.

Contrary to existing methods or techniques for producing synthetic silica and other metal oxide particles, the present method can include adding a phase enhancer, such as a non-highly polar or slightly polar alcohol, to create a stable emulsion as an enabler for particle growth from micellar particles. Also contrary to known methods or techniques, the present method further includes a measured addition rate of a second catalyst that allows for gradual particle growth without gelling of the reaction mass. This measured addition rate of a second catalyst allows for particle growth to a desired size and is a function of the type of phase enhancer molecular weight.

In further contrast to known methods or techniques, the present method provides high purity metal oxide particulars without the need to form gels that are subsequently ground or pulverized to form particles.

Figure 2:
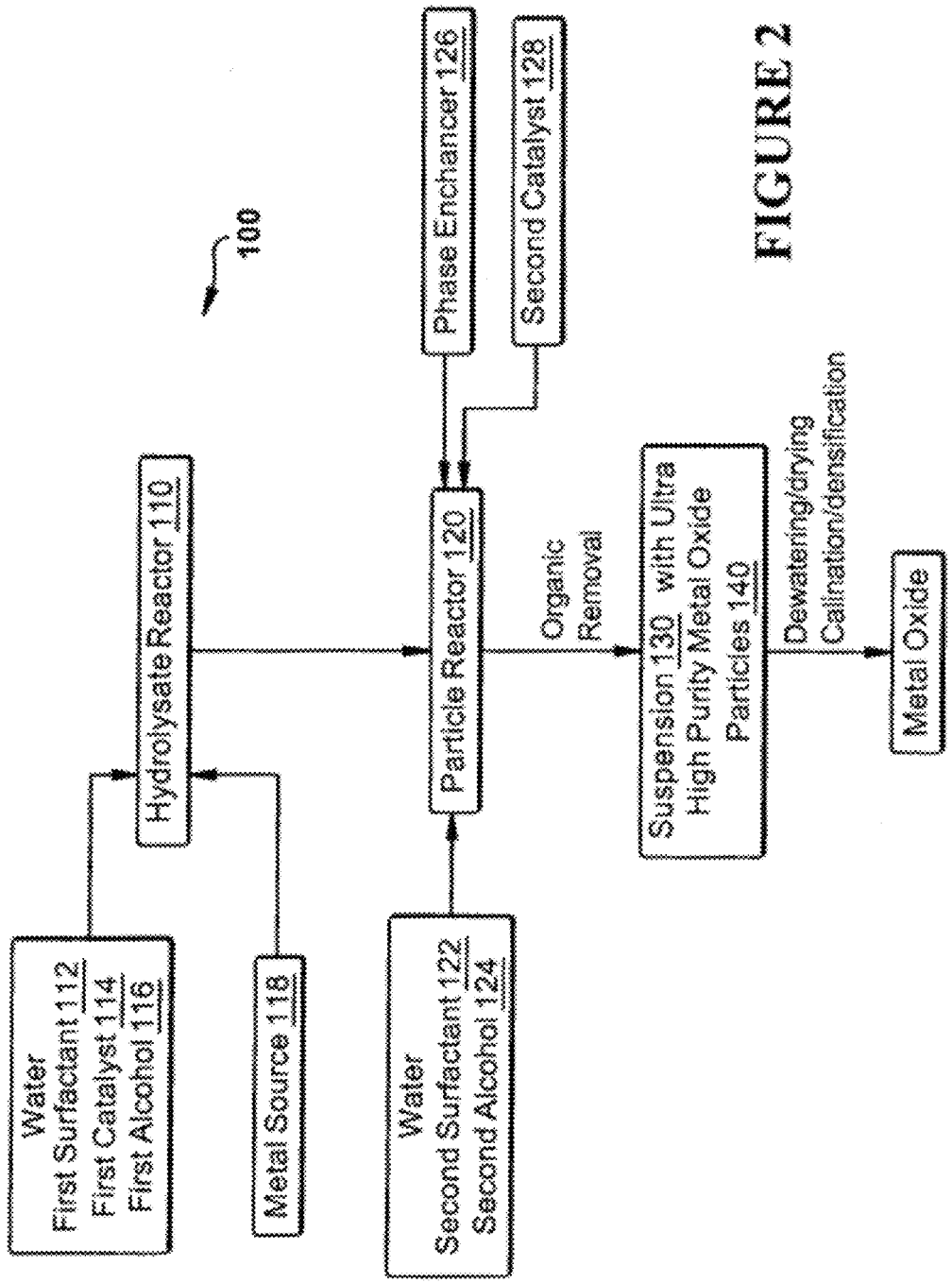
FIG. 2 shows a flow chart illustrating aspects of the method of FIG. 1.

FIGS. 1 and 2 illustrate aspects of a method for making metal oxide particles. Referring to FIG. 1, a method 10 of forming a metal hydroxide includes, as shown in block 20, providing a first phase comprising water, a metal source, a first catalyst, a first surfactant, and a first alcohol. At block 30, the method includes providing a second phase comprising water, a second alcohol, and a second surfactant. At block 40, the first phase is added to the second phase to form a blend. At block 50, the blend formed from the first and second phases is treated with a phase enhancer. At block 60, a second catalyst is added to the blend to form metal oxide particles.

FIG. 2 illustrates further aspects of the method 10 described in FIG. 1. Providing the first and second phases may include, in one aspect, preparing the first and/or second phases. Preparing the first and second phases may be accomplished by adding the appropriate components to a system, which may also be referred to herein as a container, vessel, reactor, and the like. The method 10 can include forming a metal oxide, metal oxyhydroxide, etc. The method may employ a system 100 for providing or preparing a hydrolysate reactor 110 comprising the first phase and a particle reactor 120 comprising the second phase. The contents of the hydrolysate reactor are charged to or added to the particle reactor to carry out the reaction, which will be discussed in greater detail below.

The method employs a hydrolysate reactor 110 to form or prepare the first phase. The first phase may be formed in the hydrolysate reactor 110 by adding a first surfactant 112, a first catalyst 114, a first alcohol 116, and water to the reactor 110 in proportion to the amount of metal source that promotes the formation of oligomers.

The first catalyst may comprise an acid catalyst or a base catalyst. In one embodiment, the first catalyst is an acid type catalyst. Examples of suitable acid catalysts include, but are not limited to, hydrochloric acid, nitric acid, sulfuric acid, phosphoric acid, fluoric acid, formic acid, acetic acid, propionic acid, butanoic acid, pentanoic acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, methylmalonic acid, adipic acid, p-toluenesulfonic acid, or combinations of two or more thereof. In one embodiment, the first catalyst comprises a base catalyst chosen from ammonium hydroxide, quaternary ammonium hydroxides, hydroxylamines, derivatives of hydroxylamines, amino pyridines, or combinations of two or more thereof. In one embodiment, the base catalyst has a concentration of about 0.01% to about 10% by weight.

The first alcohol may be chosen from a primary alcohol, a secondary alcohol, or a combination of two or more thereof. In one embodiment, the primary alcohol is an alcohol having one to ten carbons. Suitable alcohols include, but are not limited to, methanol, ethanol, propanol, butanol, pentanol, hexanol, heptanol, octanol, nonanol, decanol, or combinations of two or more thereof.

In one aspect, the first surfactant may be a co-surfactant system. The co-surfactant can aid in transporting solution to the micelle containing metal oxide oligomers such as, for example, low molecular weight polymethoxysiloxanes. In one embodiment, the co-surfactant system includes a mixture of a non-polar compound and a slightly polar compound. The nonpolar compound may be a hydrocarbon such as cyclic hydrocarbons including cyclopentane, cyclohexane, cyclooctane, and even derivatives thereof such as methyl cyclohexane, p-alkyl cyclohexane, and the like, and linear or branched aliphatic hydrocarbon having carbon numbers from 5 to 12 and alkyl derivatives thereof such as isopentane, isohexane, isooctane, and the like, or a combination of two or more non-polar compounds. The slightly polar compound of the co-surfactant system may be a slightly polar alcohol. Particularly suitable slightly polar alcohols may be chosen, for example, from tertiary alcohols, cyclic alcohols, or combinations of two or more thereof. Suitable tertiary alcohols include, for example, tertiary butyl alcohol, 2-methyl 2-butanol or tertiary amyl alcohol, or derivatives thereof such as 2-methyl 2-pentanol, 2-methyl 2-hexanol, and the like. Non-limiting examples of suitable cyclic alcohols include cyclopentanol, cyclohexanol, cyclooctanol and alkyl derivatives thereof such as 4-methylcyclohexanol, and the like.

Additional examples of surfactants suitable for the co-surfactant include, for example, alcoholic solvents and ketonic solvents. Examples of suitable alcoholic solvents include, for example, tertiary amyl alcohols, methyl alcohol, ethyl alcohol, n-propanol, i-propanol, n-butanol, i-butanol, sec-butanol, t-butanol, 4-methyl 2-pentanol, cyclohexanol, methylcyclohexanol, and/or glycerol. Examples of suitable ketonic solvents include acetone, methyl ethyl ketone, methyl-n-propyl ketone, methyl-n-butyl ketone, methyl-i-butyl ketone, diethyl ketone, cyclohexanone, methylcyclohexanone or acetylacetone.

The first phase includes a metal source 118. The metal source may include a single metal based material or a plurality of metal based materials. In one aspect, the metal source may be any hydrolysable or partially hydrolysable metal source that can form oligomers. The metal source may include, for example, a metal alkoxide, a hydrolysable organometallic compound, oxo metal oligomers, or mixtures of two or more thereof. Of course, the metal oxide desired as a final product will determine the identity of the metal source. Thus, in one embodiment wherein synthetic silica is the desired product, the metal source 118 is a silicon alkoxide or mixture of alkoxides where at least one of the alkoxides contains 2 hydrolyzable groups. Examples of silica sources include, but are not limited to, tetramethylorthosilicate (TMOS), tetraethylorthosilicate (TEOS), tetrapropylorthosilicate (TPOS), tetramethoxy silane, tetrabutoxy silane, methyl trimethoxy silane (MTMS), methyl triethoxy silane (MTES), phenyl trimethoxy silane and isobutyl trimethoxy silane, and higher tetraalkoxysilanes, siloxane oligomers derived from alkoxysilanes, and pre-polymerized alkoxysilanes such as polymethoxysiloxane so long as it is amenable to micelle formation, including a tetramer of polymethoxysiloxane such as methylsilicate. In one embodiment, the first phase has a molar ratio of water to siloxane oligomer derived from alkoxysilane to provide at least a siloxane heptamer, a cyclic siloxane, or mixtures thereof. A high purity silica source, such as alkoxysilane, can be obtained from a crude source such as those formed from the reaction of silicon metal with methanol in the presence of a metal catalyst such as copper such as those exemplified in E. G. Rochow, "Methyl Silicate from Silicon and Methanol," Jl. Amer. Chem. Soc. 70, 2170-2171 (1948), U.S. Pat. Nos. 4,727,173, 4,999,446, and 5,084,590, which are incorporated by reference. Purification of alkoxysilane can be accomplished by distillation as provided in U.S. Pat. No. 5,902,893 which is incorporated by reference.

Examples of other metal sources for the production of other metal oxide particles include metal compounds as isopropoxides, acetates, acetylacetonate, oxylates, butoxides, methoxides, ethoxides, chloromethoxy, chloroethoxy, methyls, ethyls, and the like. Examples of other suitable metals include, but are not limited to, Ti, Fe, Al, Zr, Nb, Y, Mg, Mn, Co, Ni, Cu, V, Ce, alkaline metals, alkaline earth metals, rare earth metals, or combinations of two or more thereof.

The first phase may be formed, in one embodiment, by first charging water, the first surfactant 112, the first catalyst 114, and the first alcohol 116 to the hydrolysate reactor 110. The metal source 118 can be added in a controlled or measured manner to the hydrolysate reactor 110. The metal source reacts in the hydrolysate reactor to form a metal oxide oligomer. The metal source may be added to the hydrolysate reactor to control the temperature rise of the system. For example, in one embodiment, a silica source is added to the hydrolysate reactor at a rate so that the adiabatic temperature rise is at a temperature range from about 10° C. to about 100° C., and preferably the temperature rise is to about 72° C. The silica source can react in the hydrolysate reactor 110 to form oligomers of methoxysiloxanes when a methoxy silane is employed. In one embodiment, the rate of adding a silica source can be about 5-15 gm/min for a 2300 gm batch size. In one embodiment, the metal source may be added to the first phase over a period of from about 20 to about 120 minutes. In one embodiment, the metal source comprises a metal alkoxide, and the molar ratio of water to metal alkoxide source in the first phase is from about 0.5 to about 4.0.

While not depicted as a separate addition, in FIG. 2, it will be appreciated that the first surfactant 112 can be added to the hydrolysate reactor 110 after the addition of the metal source 118. The first surfactant such as, for example, a co-surfactant can be added in a measured or controlled manner or added after the all the metal source is added to the hydrolysate reactor 110. As with the surfactant in the particle reactor, the co-surfactant facilitates in forming the metal oxide polymers within a micellar structure as dictated by phase equilibrium.

The second phase may be formed in a particle reactor 120. This may be accomplished by adding water, a second surfactant 122, and a second alcohol 124 to the particle reactor.

In one embodiment, the second surfactant 122 is a nonionic surfactant. The molecular weight of the nonionic surfactant, including, but not limited to those based on ethoxylate, polyethoxylate, polypropoxylate, phenolate, or polyol and the like, may be from about 400 to about 100,000. Examples of suitable nonionic surfactants include, but are not limited to, polyethylene glycol, polypropylene glycol, phenolates, polyols, polyoxyethylene stearate, polyoxyethylene sorbitan monooleate, polyoxyethylene lauryl ether, nonylphenoxypoly(ethyleneoxy)ethanol, nonylphenyoxypoly(ethyleneoxy)ethanol, and combinations of two or more thereof.

The second alcohol 124 may be chosen from a primary alcohol, a secondary alcohol, or a combination of two or more thereof. Suitable primary alcohols include, primary alcohols having from one to ten carbon atoms such as those previously described with respect to the first alcohol. The second alcohol may be the same or different than the first alcohol.

Applicants have found that suitable materials for the phase enhancer include those materials that are suitable for enhancing the stability of particle formation and preventing gelling of the suspension. Suitable for the phase enhancer 126 include, for example, slightly polar alcohols. Exemplary slightly polar alcohols for use as the second phase enhancer include low carbon alcohols. The phase enhancer 126 may include, for example, primary alcohols of one to ten carbons such as methanol, ethanol, propanol, butanol, pentanol, hexanol, and the like. The phase enhancer may also be chosen from alkyl derivatives of alcohols of one to ten carbon atoms including, but not limited to, isopropanol, isobutanol, isopentanol, and the like. Secondary alcohols may also be suitable for use as a phase enhancer.

In one embodiment, the phase enhancer 126 is added to the system after the first phase is added by adding the contents of the hydrolysate reactor 110 to the particle reactor 120. The phase enhancer 126 is added to the particle reactor and allowed to equilibrate. In one embodiment, the phase enhancer is added immediately after all the material from the hydrolysate is fed to the particle reactor and allowed to equilibrate within the micelles. The addition of the phase enhancer 126 prior to adding the catalyst to the particle reactor, enhances the stability of large particle formation, allows for the generation of consistent particle growth and prevents the gelling of the suspension.

The method includes adding the contents of the hydrolysate reactor 110 to the particle reactor 120. The first and second phases are then mixed together in the particle reactor 120 to form a blend. Mixing influences the size of the initial micellar diameter as well as particle growth and final particle size. Turbulent mixing tends to generate smaller particles and nearly uniform particle size distribution. Slower mixing with less turbulence tends to: (1) generate a wide particle size distribution; and (2) cause metal oxide particles to settle prematurely at the bottom of the particle reactor before attaining further particle growth to form unwanted packed solid particles. Therefore, a suitable mixing regime is desirable to effectively suspend large particles as the clusters grow from micelles to a final stable particle size and distribution. This suitable mixing regime further may be dictated by the type of agitator and the tip speed impeller velocity. The tip speed impeller velocity may be about 0.2 to 0.8 feet per second. In one embodiment, the first phase may be added to the second phase over a period of about 30 minutes to about 150 minutes.

After addition of the first phase to the second phase, a biphasic system forms as shown by the presence of a suspension or emulsion. The second surfactant aids in forming micelles to a size dictated by phase equilibrium. The particle reactor contains a biphasic system that allows particle growth from micelles. The temperature of the first phase may be from about 30° C. to about 80° C., and the temperature of the second phase may be from about 30° to about 100° C. The temperature of the initial emulsion can be about 30-80° C. to further enhance the biphasic system formed in the particle reactor. In one embodiment, the temperature is about 50-60° C., which is the cloud point for the nonionic surfactant PEG.

Figure 3:
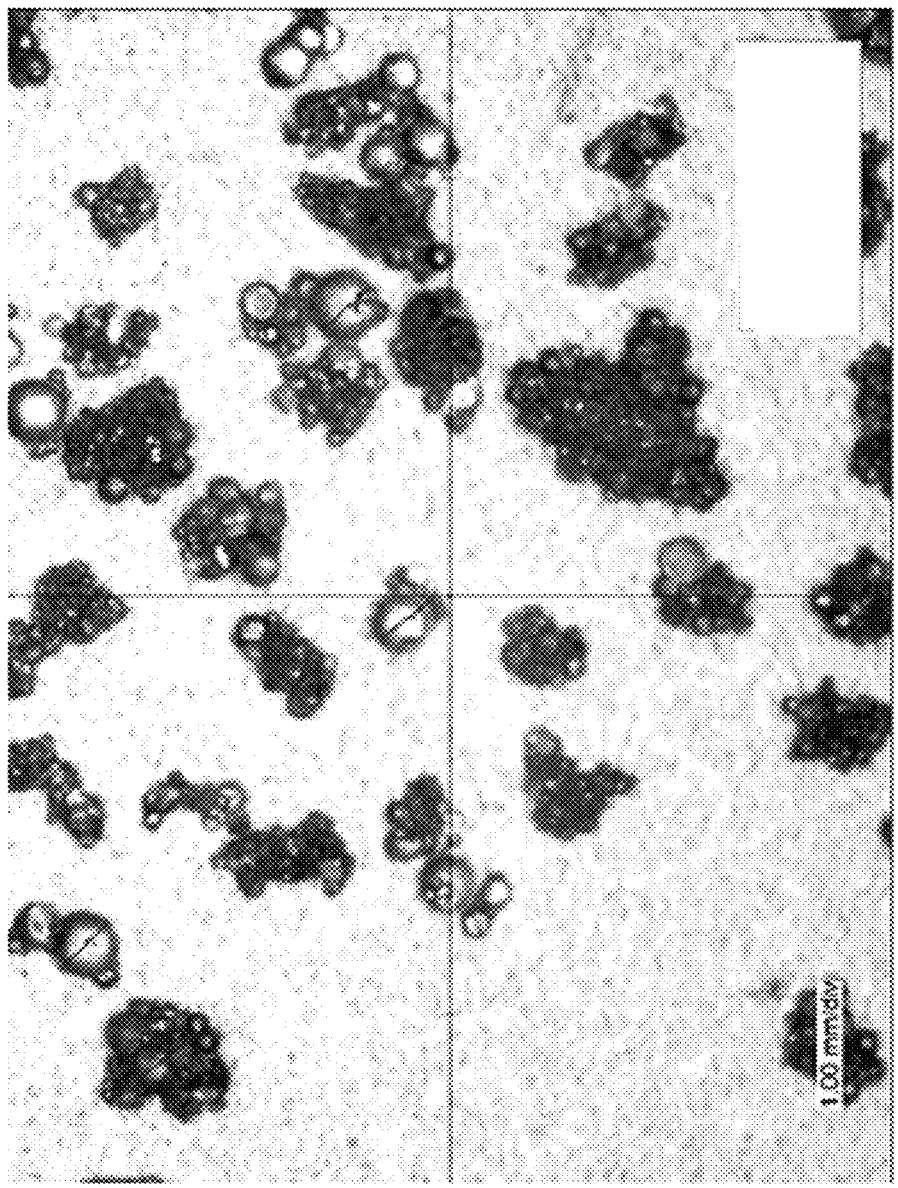
FIG. 3 shows an optical microscope of high purity silica particles formed in one embodiment of the method.
Figure 4:
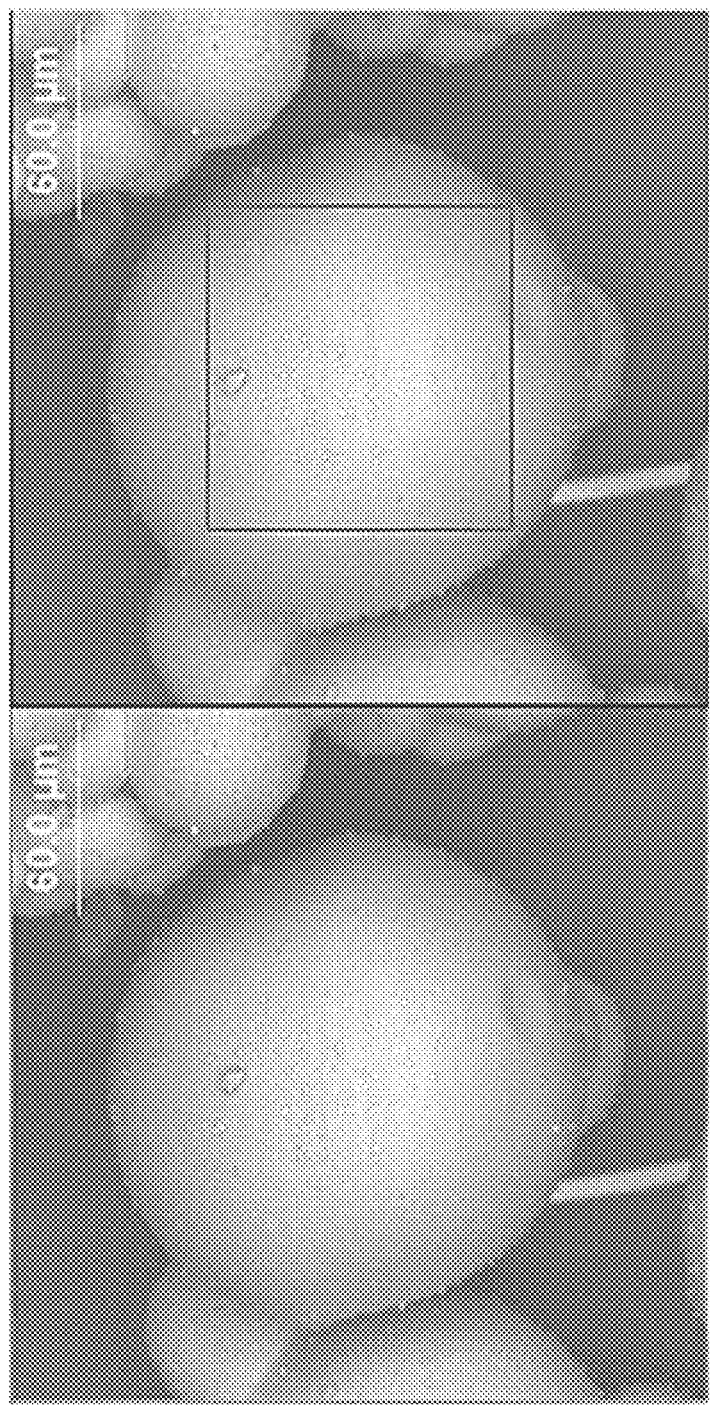
FIG. 4 shows a scanning electron microscopy of high purity silica particles derived from the method.

As described above, the phase enhancer 126 may be added to the system after the first phase from the hydrolysate reactor is added to the particle reactor. After addition of the phase enhancer 126, the method includes a measured or programmed addition of a second catalyst 128 to the particle reactor 120. The second catalyst 128 is added in a measured or programmed manner to the particle reactor 120 so that the metal oxide oligomer within the mixture forms the desired metal oxide particle as opposed to forming an undesirable gellified suspension or particle to particle adhesion by hydrogen bonding. Thus, a measured addition of the second catalyst 128 aids in partially opening up the layer of a nonionic surfactant to allow the particles to interact and form metal oxide bonds with other particles as a mode of particle growth as shown in FIG. 3 and FIG. 4.

Considering the specific example of forming silica particles, the formation of siloxane bonds between the silica particles allows the formation of larger particles while oligomers are undergoing internal self-condensation or curing. Otherwise, the addition of too much catalyst at one time may cause the surfactant to fragment and expose the micellar particles containing partially converted polymethoxysiloxane or higher oligomers therefrom, which results in formation of a highly cross-linked gel containing water and organics and soluble silicates. This results in a permanent gellification of the suspension with no recovery of micellar particles. Therefore, the measured or programmed addition of the catalyst allows the controlled description of the surfactant from the surface of the particle.

The second catalyst 128 may be chosen from an acid or base. In an exemplary embodiment, the second catalyst 128 is a base. Suitable base catalyst materials include, for example, non-alkaline metal bases such, organic bases, non-metal bases that promote nucleophilic substitution or combinations of two or more thereof. Examples of suitable non-alkaline metal bases include about as ammonium hydroxide, as well as aqueous solution of ammonium carbonate or ammonium bicarbonate. Examples of suitable organic bases include quarternary alkyl ammonium hydroxides such as tetramethylammonium hydroxide. Examples of suitable non-metal bases that promote nucleophilic substitution include hydroxylamines and organic hydroxylamines such as N,N-dimethylhydroxylamine, N,N-diethylhydoxylamine; and 4-dimethylaminopyridine.

An acid catalyst can also be used, but the reactivity is slower towards particle growth. Examples of suitable acid catalysts includes inorganic acids such as hydrochloric acid, nitric acid and sulfuric acid, and the like.

In one embodiment, the base catalyst has a concentration of 0.01% to about 10% by weight. In another embodiment, the base catalyst can have a concentration of about 0.05% to about 5% by weight. In still another embodiment, the base catalyst has a concentration of about 0.1% to about 2.5% by weight. In a further embodiment, the base catalyst has a concentration of about 0.5% to about 1% by weight. Here, as well as elsewhere in the specification and claims, individual ranges can be combined to form additional and/or non-disclosed ranges. In one embodiment in which the method is employed for forming silica particles, the base catalyst desirably has a relatively low concentration so that it will allow the silica particle within the micelle to form via self-condensation of polymethoxysiloxane or its oligomers to silica; otherwise undesirable cross-linking and gelling of the suspension will occur and concomitant formation of soluble silicates.

The base catalyst is added to the mixture until a mean silica particle size desired is obtained. Generally, the silica particle size increases with the amount of catalyst added to the particle reactor up to a critical pH. The silica particle size is measured as the particle diameter using a measuring system such as, for example, a Horiba LA950 system. During the initial addition of the catalyst, the pH of the suspension may be about 1.3. Depending on the amount of base catalyst added, the pH of the mixture may increase to a pH of about 5, depending upon the level of alkoxysilane and acid catalyst used in the hydrolysate. Desirably, the pH of the mixture is no greater than about 3.5 prior to treating with the second catalyst, and no greater than about 6 during the treatment step with the second catalyst. Once the silica particles grow to the desired size, the catalyst is no longer added and the silica particles are allowed to age at the temperature of the particle reactor.

Again, while the above conditions were described with respect to forming silica particles, it will be appreciated that such operating conditions and procedures may be suitable in the formation of other metal oxide particles.

The particles may then be aged by allowing to stand at isothermal conditions for a selected period of time, e.g., several minutes to several hours. At this point, the particles may be generally soft but tend to show a distinct morphology. Without being bound to any particular theory, the particles are semi-solid internally, and full conversion to, for example, silica takes place during and after removal of organics such as methanol.

After ageing the suspended metal oxide particles, the organics are removed or stripped to obtain essentially an aqueous slurry or suspension 130 of metal oxide particles 140. The organics are mainly alcohols and nonpolar hydrocarbon that can be recycled. Removing most of the organics from the initial slurry can be accomplished in a variety of ways such as high temperature evaporation past the highest boiling compound or by use of low temperature and negative pressure stripping. The removal of the residual oranics, however, from a solid-liquid mixed phase is much more difficult, and the present invention provides methods for removal of such materials. Without being bound to any particular theory, residual organics are believed to be those organics that are bound or trapped within the particle and can be up to about 5% carbon on a dry basis. Embodiments of a method and system for stripping the organics are illustrated below with respect to FIGS. 5, 6A, and 6B. In one embodiment, high temperature stripping may be performed at about 80° C. with no reflux. Without being bound to any particular theory, upon stripping the organics, the particles in the metal oxide (e.g., silica) slurry are cured or hardened to provide a relatively crush resistant particles having a robust particle size distribution.

The metal oxide particle obtained is a high purity metal oxide particle suspended in water. The concentration of water in this solution may be from about 50% to about 99% by weight. The concentration of metal oxide particles in this aqueous slurry may be about 1% to 50% by weight. In one embodiment, the concentration of metal oxide particles is about 25%.

Further, the metal oxide particle obtained may be of a high purity and generally free of impurities. Impurities are unintended and/or undesirable inclusions in the final product, and may result from, for example, processing and handling. Other impurities may result from contaminants in raw materials.

Some impurities may be more closely associated with select raw materials. Impurities are distinguished from dopants in that the impurity does not intentionally aid in the function of the product, or produces an undesirable effect in the final product. Undesirable effects may include color, optical absorption, electrical properties (such as carrier mobility, resistance, or conductivity), or the like. It will be appreciated that dopants may be desirable to adjust the properties of the silica for a particular purpose or intended use, e.g., such as for use in pharmaceutical or semiconductor applications.

In one embodiment, the metal oxide particle(s) have metal impurities of about 100 ppb or less for each metal element impurity. In another embodiment, the particles have a metal impurity concentration of about 50 ppb or less for each metal element impurity. In still another embodiment, the metal impurity concentration may be about 10 ppb or less for each metal element impurity. In another embodiment, the metal impurity concentration may be about 5 ppb or less for each metal element impurity. In yet another embodiment, the total metal impurities may about 3 ppb or less for each metal element impurity. In an even further embodiment, the metal oxide particles may have an impurity concentration of from about 1 to about 100 ppb for each metal element impurity. In still a further embodiment, the metal oxide particles may have an impurity concentration of from about 3 to about 50 ppb for each metal element impurity. Here, as well as elsewhere in the specification and claims, individual ranges can be combined to form additional and/or non-disclosed ranges.

In one embodiment, the metal oxide particle(s) have total impurities of less than 100 ppb, and in another embodiment, the total impurities may be less than 50 ppb. In still another embodiment, the total metal impurities may be less than about 10 ppb. In another embodiment, the total metal impurities may be less than about 5 ppb. In yet another embodiment, the total metal impurities may be less than about 3 ppb. In yet another embodiment, the total impurities may be less than 1 ppb. In a specific embodiment, the method provides silica particles having less than 1 ppb of Fe. Here, as well as elsewhere in the specification and claims, individual ranges can be combined to form additional and/or non-disclosed ranges. The majority of contamination is expected to come from the raw materials such as the alkoxysilanes and facilitating chemical agents such as acids/bases or organics, which typically are prepared without the use of metals or metal assisted reactions. Moreover, the latter can be purified by simple distillation and, when recovered, recycled back to the process, these organics are essentially metal-free when run in a glass separation column.

As previously described, the process may include a removing organics from the particles such as by a stripping process. While this may be suitable to remove organics such as alcohols and nonpolar hydrocarbons, inorganic carbon may be present in the formed particles. Inorganic carbon may be considered an impurity in silica and can reduce the bubble quality of a fused quart material formed from silica particles containing residual inorganic carbon. In one embodiment, the process further comprises subjecting the metal oxide particles to a washing step comprising washing the particles with an aprotic solvent. The washing step may comprise washing the metal oxide particles in an aprotic solvent alone, washing with an aprotic solvent followed by a water rinse, washing with an aprotic solvent/water composition and conducting an aprotic solvent/water stripping operation, or a combination of two or more thereof. The washing operation may be conducted one, two or more times as may be desired. For example, a washing operation comprising washing with an aprotic solvent followed by a water rinse may be performed one, two, or more times on the metal oxide particles. The aprotic solvent may be chosen from acetone, dimethyl ether, dichloromethane, tetrahydrofuron, dimethylformamide, acetonitrile, dimethyl sulfoxide, ethyl acetate, etc., and combinations of two or more thereof. In one embodiment, the aprotic solvent is acetone.

In one embodiment, washing the metal oxide particles with the aprotic solvent comprises washing at an elevated temperature. In one embodiment, washing with the aprotic solvent comprises washing at a temperature greater than about 25° C. In another embodiment, washing with the aprotic solvent comprises washing the particles with the aprotic solvent having a temperature from about 20° C. to about the boiling point of the aprotic solvent. Washing may also be carried out with reflux. In one embodiment, the aprotic solvent is acetone, and the washing is carried out at temperature of about 20 to about 110° C. with reflux.

Following the washing step with the aprotic solvent, the metal oxide particles may have a residual carbon content of less than about 1 wt. %. In one embodiment, the metal oxide particles have a residual carbon content of less than about 0.5 wt. %. In another embodiment, the metal oxide particles have a residual carbon content of less than about 0.1 wt. %. In still another embodiment, the metal oxide particles have a residual carbon content of less than about 500 ppm (0.05 wt. %). In yet another embodiment, the metal oxide particles have a residual carbon content of less than about 100 ppm (0.01 wt.%). The metal oxide particles may contain from about 10 ppm (0.001 wt. %) to about 1 wt. % of residual carbon; from 0.01 to about 0.5 wt. % of residual carbon; from about 0.05 to about 0.25 wt. % residual carbon; or even from about 0.1 to about 0.2 wt. % residual carbon. Here, as well as elsewhere in the specification and claims, individual ranges can be combined to form additional and/or non-disclosed ranges.

To produce the final, desired metal oxide particles, the particles may be dried, calcined, and or densified following the washing steps. Following the washing step, which includes water rinses following the aprotic solvent washes, the particles are hydrated particles suspended in water. The water may be removed by decanting the suspension to remove the bulk of the water and provide a high solids slurry of metal oxide particles. Dewatering and drying may be carried out under any suitable conditions to remove water from the slurry and particles. The high solids slurry may be transferred to any suitable drying equipment such as, for example, a rotoevaporator, and the slurry and particles may be heated under vacuum to remove the water. The heating may be carried out, in one embodiment, at a temperature of from about 70° C. to about 110° C. The resulting products from the dewatering/drying step are dried, hydrated metal oxide particles.

The dried, hydrated metal oxide particles may then be heated to allow any residual organics or carbon to desorb from the particles, to calcine the particles, or both. The dried, hydrated particles may be heated under suitable temperature and pressure conditions to all the organics to desorb from the particles and be volatilized and or removed by a sweep of a purge gas (e.g., Ar or $N_2$). The heating may be conducted in any suitable heater such as a vibratory or rotary furnace. Heating may be carried out at a temperature of from about 100° C. to about 250° C. Heating may also be carried out under a vacuum (e.g., from about −14 psig to about −0.1 psig) with a nitrogen purge. Alternatively, heating may be carried out at atmospheric pressure with a nitrogen purge.

The particles may then be calcined. The calcining step may be carried out using any suitable heating equipment including, but not limited to, a vibratory furnace, a rotary furnace, a fluidized bed, etc. Heating may be conducted at atmospheric pressure in an oxygen containing environment. The oxygen containing environment may comprise oxygen or a mixture of oxygen and ozone. The oxygen containing environment is not required to be a 100% oxygen or oxygen/ozone environment, but may be air, or may include other gases including inert gases, nitrogen, etc. The calcining step may step may be conducted at a temperature of from about 350° C. to about 1000° C. Applicants have found the particles produced by the present process may be calcined at relatively low temperatures.

Following the calcinations step, the particles may be densified to produce dense silica particles having a desirable surface area. The densification step may be carried out in a rotary furnace or fluidized bed or other suitable heating equipment. Heating may be carried out at a temperature of from about 600° C. to about 1,300° C. at atmospheric pressure. The particles are held in a hot zone ideally with a gas such as helium or other gasses that diffuse rapidly in silica and the temperature is held high enough to densify the particles and reduce the surface area to a desired value.

Figure 5:
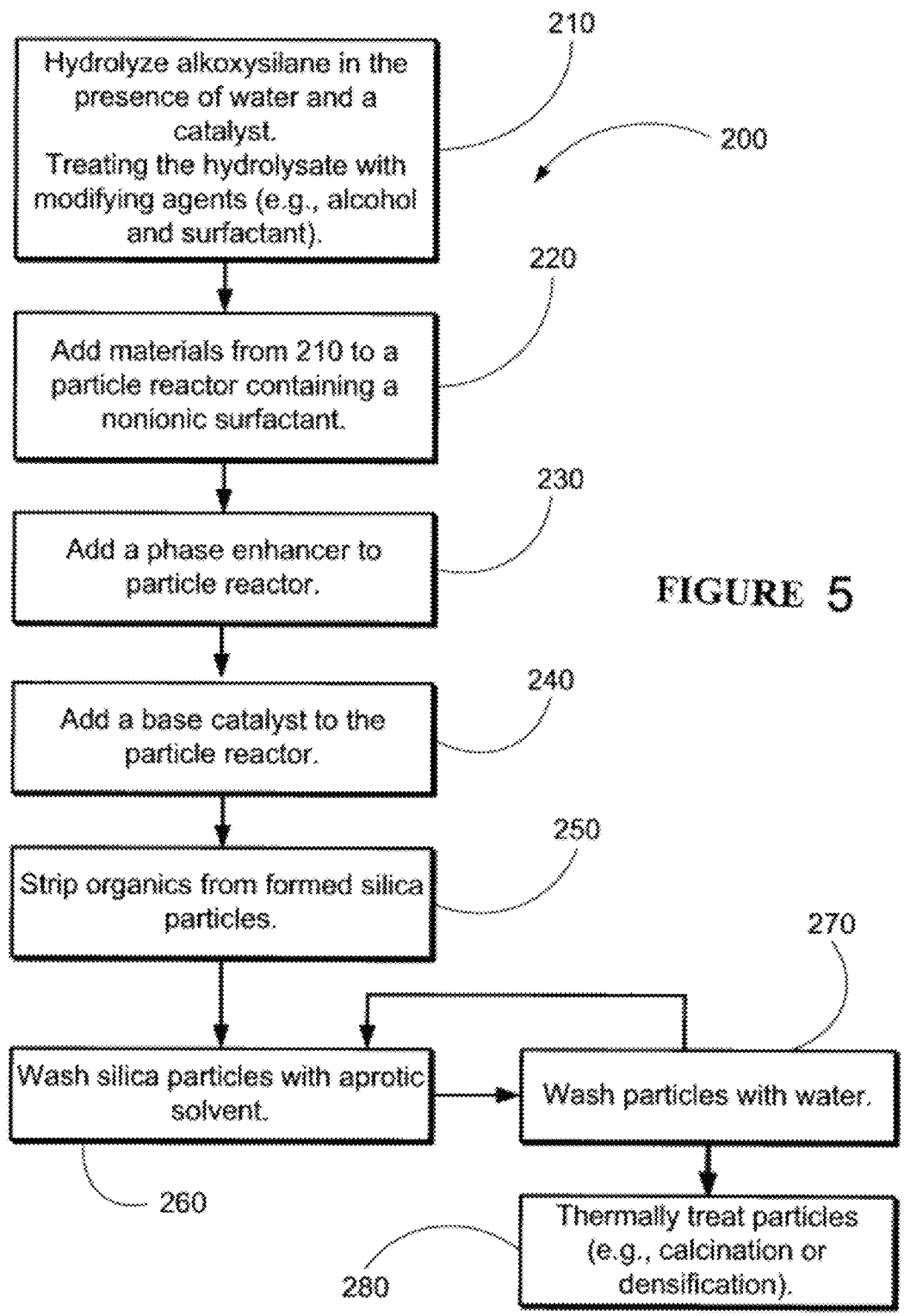
FIG. 5 is a flow chart illustrating an embodiment of a method for making high purity silica particles.
Figure 6A:
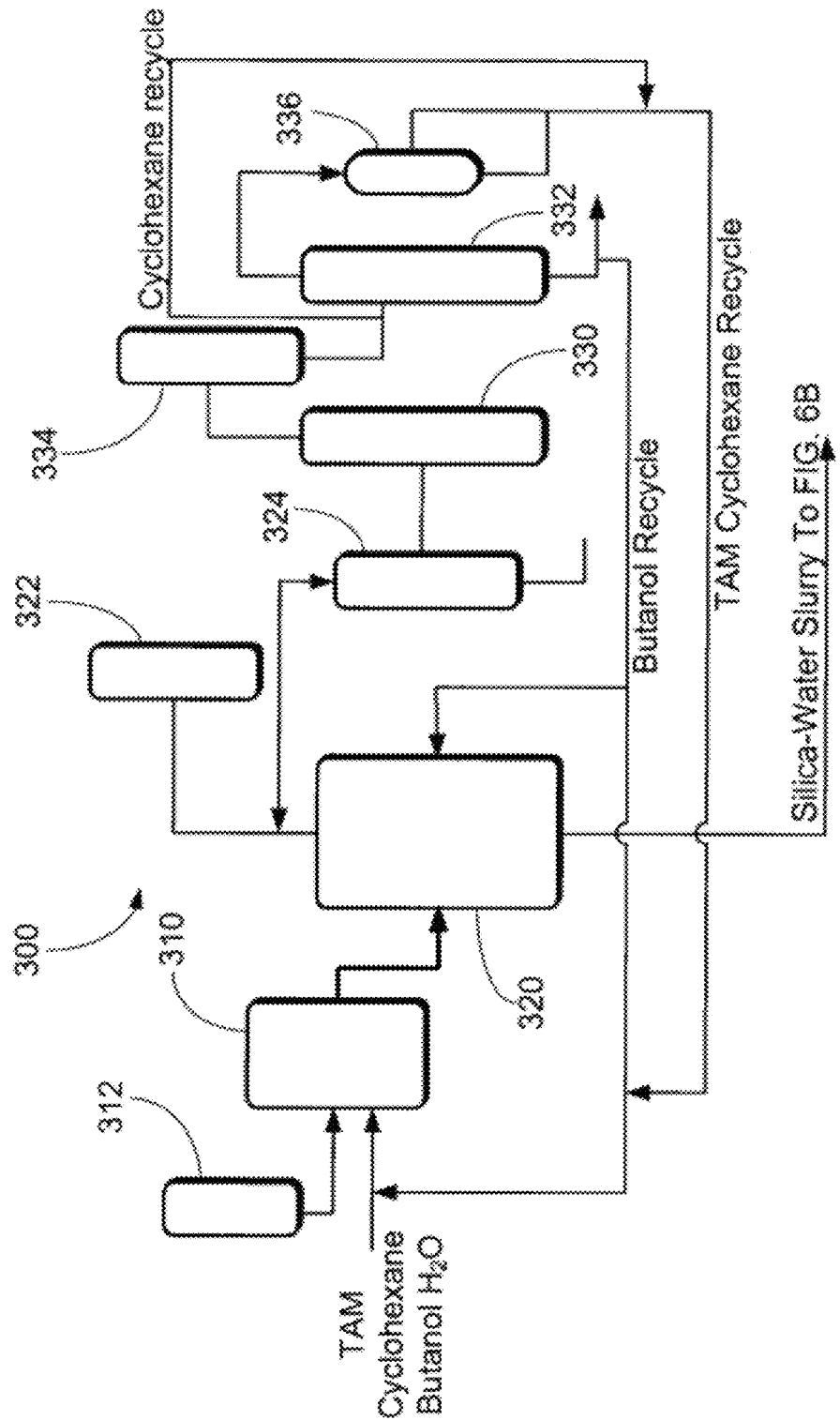
FIGS. 6A-B are schematics illustrating a system for making high purity metal oxides and synthetic silica in accordance with embodiments.
Figure 6B:
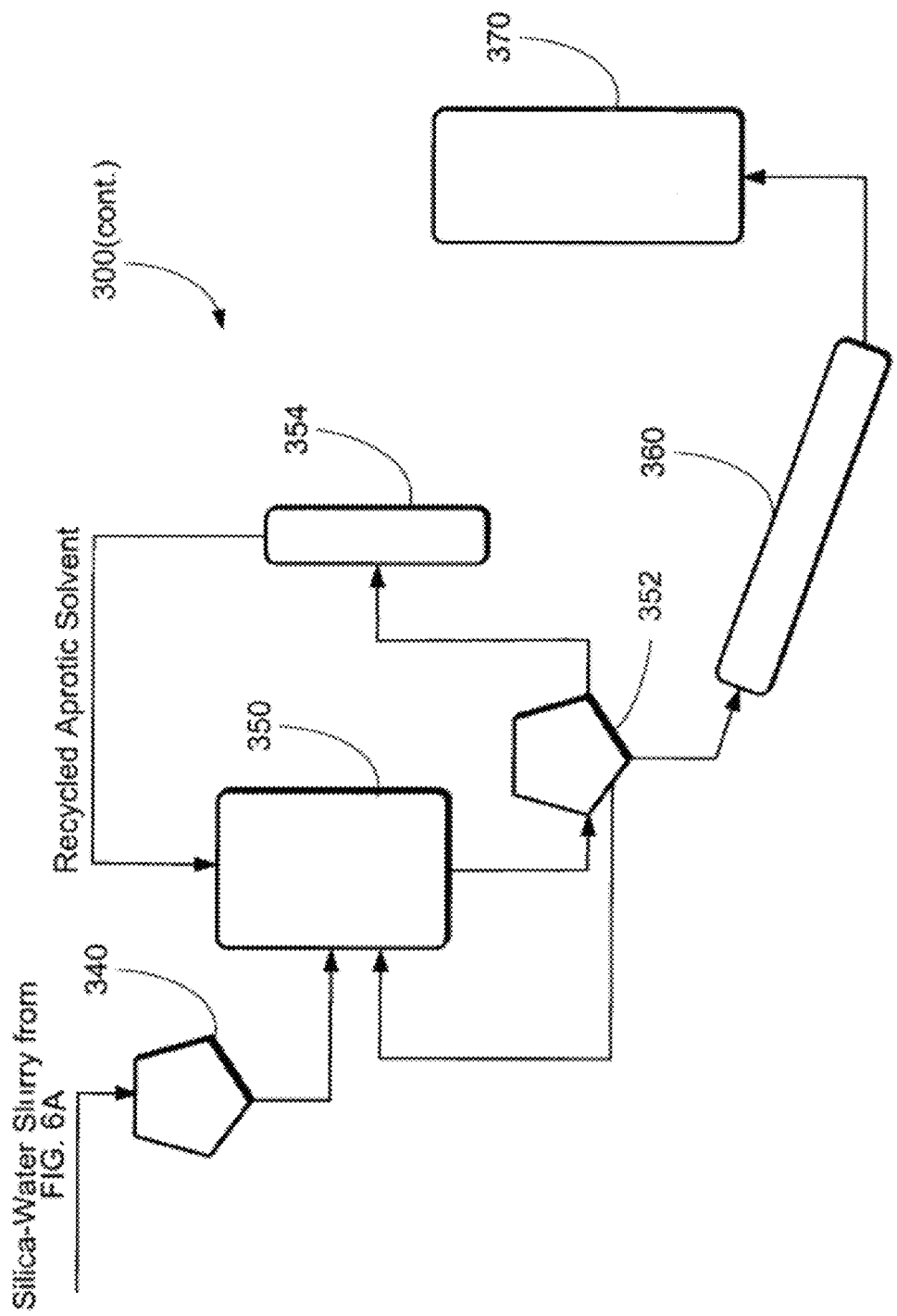

FIGS. 5, 6A, and 6B illustrate an embodiment for producing synthetic silica. FIG. 5 is a flow chart illustrating a process 200 for producing synthetic silica, and FIGS. 6A-B are schematic illustrations of a system 300 for carrying out the various steps. At step 210 in FIG. 5, the process includes hydrolyzing or partially hydrolyzing an alkoxysilane in the presence of water and a catalyst, and treating the hydrolysate with modifying agents such as an alcohol and a surfactant (e.g., a co-surfactant). Referring to FIG. 6A, an alkoxysilane may be fed from a source 312 to a hydrolysate reactor 310 comprising water and a catalyst. Modifying agents such as an alcohol and surfactant (e.g., a co-surfactant of cyclohexane and tert amyl alcohol) may then be charged to the hydrolysate reactor from source(s) 314, and the contents of the hydrolysate reactor 300 are mixed. The co-surfactant may enhance the formation of micellar particles.

At step 220 in FIG. 5, the contents of the hydrolysate are fed to a particle reactor (e.g., particle reactor 320 of FIG. 6A) containing a nonionic surfactant (e.g., polyethylene glycol). At step 230, a phase enhancer (e.g., butanol) is added to the particle reactor. In one embodiment, the phase enhancer is added to the particle reactor after all the hydrolysate is fed to the particle reactor. As shown in FIG. 6A, the system may include a reflux condenser 322. The particle reactor may be kept, for example, at a temperature of about 50° C. to about 70° C., and the reflux condenser 322 keeps the cyclohexane in the reactor, which, without being bound to any particular theory, is believed to maintain good micellization.

At step 240, a base catalyst (e.g., ammonia hydroxide) is added to the particle reactor to promote and control agglomeration and particle growth. The particles are reacted for a selected time to achieve a desired particle size.

At step 250, the majority of the organics are stripped from the particle reactor to provide a silica water slurry. Stripping may be carried out by stripping under vacuum or high temperature stripping (e.g., at about 80° C. with no reflux). The stripping step 250 may be conducted by heating the metal oxide particles (e.g., silica) at about 30 to about 100° C. for a sufficient period of time to remove the organic material.

The process for forming silica particles employs materials that can be separated and recycled back to the process. Thus, the system may be provided with suitable components for separating the various surfactants, phase enhancer, and alcohols, and recycling them back to the hydrolysate reactor or the particle reactor. In one embodiment, the stripping column 330 may be sufficient to allow the materials to be separated. In another embodiment, where the boiling point of the materials is relatively close, separation may not be trivial and a second column may be necessary. For example, where the process employs tert amyl alcohol as a surfactant and butanol as the alcohol component(s) or the phase enhancer, a second column may be necessary because tertiary amyl alcohol and butanol have a boiling point difference of about 15° C. Separation of these components may require azeotropic distillation. Cyclohexane may be a suitable azeotropic agent, thus the use of cyclohexane as a surfactant provides the added benefit of a built in azeotropic agent when it comes time to separate and recycle the materials. The materials may be separated via the stripping column and the columns 332 and 334 and recycled back to the hydrolysate reactor or the particle reactor. Referring to FIG. 6A, the organic recycle system may include a stripping column 330. The stripping column may include a slip stream to purge out metal impurities so that the resulting organic material is a high purity. In one embodiment, gas sparging can be used to enhance stripping and organic phase removal.

While the process 200 in FIG. 5 and the system in FIGS. 6A-B illustrate an embodiment comprising thermal treatment step 250 to strip organics from the particles, it will be appreciated that such a step is optional and may be excluded from the method. In one embodiment, residual organics may be effectively removed by treating the particles with the aprotic solvent alone.

The silica particles are then treated with an aprotic solvent to assist in removal of residual organics and inorganic carbon. In one embodiment, treating with the aprotic solvent comprises washing the particles with the aprotic solvent. The aprotic solvent may be decanted, and the decanted solutions contain the aprotic solvent and organic material. The particles may be washed one, two, or more times until the desired organic level and inorganic hydrocarbon level is achieved.

In another embodiment, as shown in FIG. 5, treating with the aprotic solvent comprises washing with the aprotic solvent such as described above, but further comprises washing the particles with water (step 270). Steps 260 and 270 may be repeated as desired to effectively remove the residual organic carbon.

In still another embodiment, treating with the aprotic solvent comprises an aprotic solvent/water stripping step. An aprotic solvent/water stripping step may comprise adding the aprotic solvent and water to the suspension of metal oxide particles. The suspension is then heated to remove organic material along with the aprotic solvent and the water via vaporization. These steps may be repeated until a desired level of organic material and inorganic hydrocarbon is achieved. Heating may be conducted, for example, at a temperature of from about 75 to about 100° C. When multiple aprotic solvent/water stripping steps are employed, the temperature of the various steps may the same or different from one another. In one embodiment, the temperature of the heating step in the aprotic solvent/water stripping operation is increased with each successive treatment. In one embodiment, one or more hot water washes may also be employed after the aprotic solvent/water stripping treatments have been completed. The additional water washes may be useful to ensure complete elimination of organics from the system.

Following the treating step(s), at step 280, the particles are then thermally treated such as by drying, calcining, densifying, or a combination of two or more thereof to provide particles of a desired particle size distribution and density. In one embodiment, the treatment operations of the present invention may provide metal oxide particles with a sufficiently low carbon content that oxidative removal of carbon or hydrocarbon material via calcination is not required and the particles may be subjected to densifying operations (and sintering if desired) to provide the final metal oxide particles.

FIG. 6B illustrates components suitable for use in conducting the aprotic solvent treatment operations and the thermal treatment operations such as calcining or densifying. The silica-water slurry is treated by first removing water from the slurry and feeding the silica particles to an acetone washer. A settler 340 may be used to allow the particles to separate out of the slurry by gravity. The water is removed or filtered off and the particles are fed to the acetone washer 350. The acetone or water-silica slurry is fed to the silica settler 352 and the particles allowed to separate out by gravity. If the particles are to be treated again, they are fed back to the acetone washer 350. The system may include an acetone stripper 354 to remove the acetone and heavy organics. Following the last treatment, they are fed to a dryer such as the rotary dryer 360 for desorbtion and water removal. In the system in FIG. 6B, the particles are then fed to the fluid bed for densification.

While the embodiment described with respect to FIGS. 5 and 6A-B was described in terms of producing synthetic silica, it will be appreciated that the process and system may be suitable for producing other metal oxide particles. Additionally, while certain steps may have been described with respect to certain processing conditions, it will be appreciated that the steps are not intended to limit the process described and claimed herein in any manner.

Further, while the treatment operations described above for removing organics from the particles (e.g., by stripping) and the treating the particles with the aprotic solvent were described with respect to the embodiment illustrated by and described with respect to FIGS. 5 and 6A-B, it will be appreciated that such treatment operations are not limited to that embodiment and are not limited to any particular order of operation. In one embodiment, the treatment process may comprises an organic stripping operation followed by treatment with the aprotic solvent. In one embodiment, these operations can be repeated for two or more cycles of stripping and aprotic solvent treatment. In one embodiment, the particles may be treated with the aprotic solvent and then subjected to removal of organics such as by a stripping process. In another embodiment the treatment process may comprise treating with an aprotic solvent, removal of organics such as by stripping, followed by additional treatment(s) with the aprotic solvent.

The foregoing method of producing metal oxide particles allows for and is capable of providing yields up to about 100% of the metal source or oligomers derived from it to metal oxide and a high yield on particles at the desired particle size and range. In one embodiment, the metal oxide particles formed by the present method may have a primary particle size of from about 0.5 microns to about 100 microns. In one embodiment, at least about 80% of the primary particles are within +/−15% of the mean diameter of the primary particle size. It will also be appreciated that primary particles may agglomerate. In one embodiment, the primary particles may agglomerate to sizes of from about 5 microns to about 1,000 microns with a mean particle size that range from 150 microns to 350 microns. In one embodiment, the metal oxide particles obtained using the disclosed method may range from about 50 microns to about 600 microns. In contrast, the yield in known grinding and pulverization techniques is no more than 70% of theoretical metal oxide yield, whereas in the present method the particle yield may be better than 95% in the 60 to 600 micron range. In one embodiment, at least 80% of the metal oxide particles have a size of about 70 to about 350 microns. In one embodiment the particles have a particle size distribution where 90% of the particles have a particle size of about 1 and about 1,500 µm. In another embodiment, about 90% of the particles have a particle size of about 20 and about 1,000 µm. In yet another embodiment, about 90% of the particles have a particle size of about 50 and about 500 µm. In still another embodiment, about 90% of the particles have a particle size of about 75 and about 40 µm. Here, as elsewhere in the specification and claims, individual ranges can be combined to form additional and/or non-disclosed ranges. The metal oxide particle size may be measured as the particle diameter using a suitable measuring system such as, for example, a Horiba LA950 system.

The surface area of silica particles prior to calcination and densification obtained via the method may be for example, from about 150 to about 800 $m^2/g$, the average pore radius may be about 15-45 Angstroms. In one embodiment, the particles have a surface area of about 50 to about 1,300 $m^2/g$. In another embodiment, the particles have a surface area of about 100 to about 1,000 $m^2/g$. In another embodiment, the particles have a surface area of about 350 to about 900 $m^2/g$. In still another embodiment, the particles have a surface area of about 450 to about 700 $m^2/g$. Here, as elsewhere in the specification and claims, individual ranges can be combined to form additional and/or non-disclosed ranges.

The particles produced by the present method may be used in a variety of applications. Silica particles, for example, may be used to form glass articles of any desired shape or size using any suitable method. In one embodiment, the silica particles may be used to form fused articles. High purity silica particles formed using the described methods may be utilized to form silica articles that have a low hydroxyl (OH) concentration. In one embodiment, a glass article formed from the high purity silica particles has an OH concentration of about 5 ppm or less. In another embodiment, a glass article formed from the high purity silica particles has an OH concentration of about 2 ppm or less. In still another embodiment, a glass article formed from the high purity silica particles has an OH concentration of about 1 ppm or less. In yet another embodiment a glass article formed from the high purity silica has an OH concentration of from about 1 to about 5 ppm. Here, as elsewhere in the specification and claims, individual ranges can be combined to form additional and/or non-disclosed ranges.

Additionally, the method for treating the particles allows for providing high purity metal oxide particles that are low in organic content, low in inorganic carbon content, or both. While the method for treating the particles was described with respect to a particular process for forming the particles, it will be appreciated that the treatment methods comprising the organic stripping operation, treatment with an aprotic solvent, or both may be utilized on metal oxide particles formed by other processes.

Aspects of the invention may be further understood and described with respect to the following examples, which are not intended to limit the invention in any manner.

EXAMPLES

The following examples for the production of synthetic metal oxides is intended only to illustrate methods and embodiments in accordance with the invention, and as such should not be construed as imposing limitations upon the claims. Unless specified otherwise, all ingredients or substrates identified are commercially available from common chemical suppliers.

Example 1

The following illustrates the production of a particle reactor was formed as follows: 350.7 grams high purity water is added to 5.25 grams of electronic grade 1500 MW polyethylene glycol. To this, 39.4 grams of butanol is added to form the particle reactor as shown by the presence of an emulsion. This mixture was kept at 52° C. under reflux.

A hydrolysate reactor was prepared as follows: 40.89 grams of butanol is added to 21 grams of water and 0.8 grams of 37% HCl. High purity tetramethylorthosilicate (TMOS) is added slowly so that the temperature rise achieves about 72° C. The total amount of TMOS added is such that a 25% silica results on an organics-free basis. After all TMOS is added, a co-surfactant formed separately with 23.6 grams of cyclohexane and 76.02 grams of high purity tertiary amyl alcohol is added and mixed thoroughly.

Figure 7:
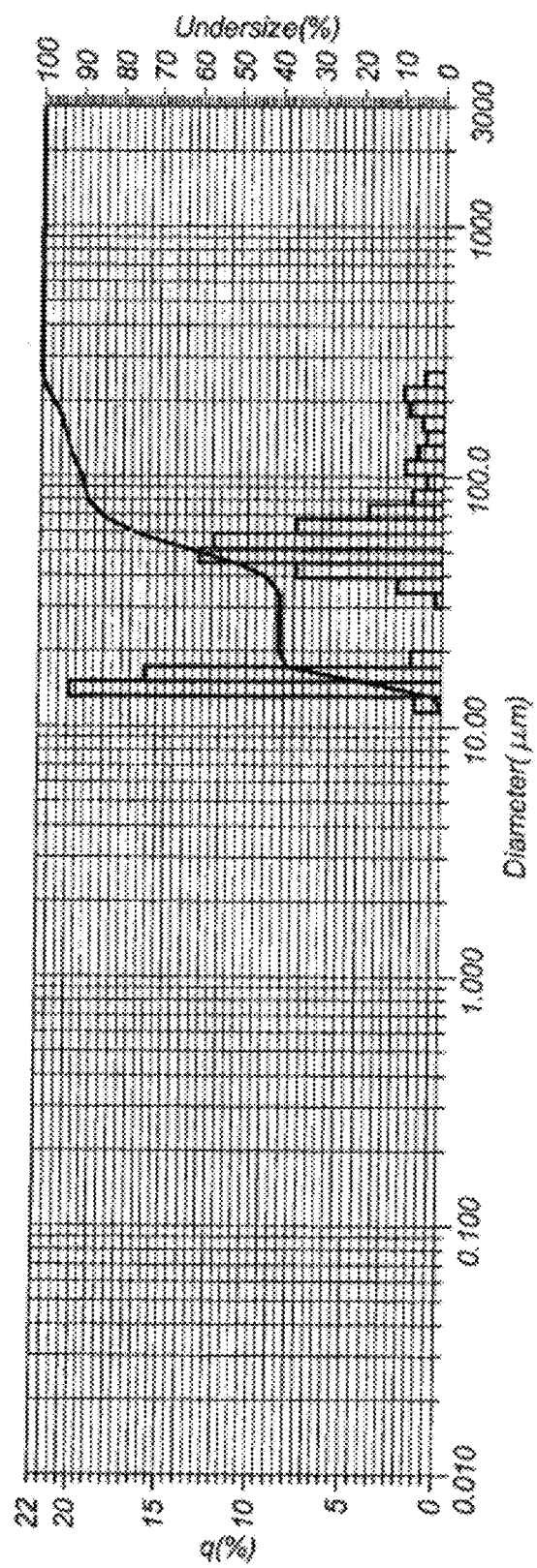
FIG. 7 shows a graph identifying the particle size distribution of high purity synthetic silica formed early during the addition of a second catalyst in accordance with one embodiment of the method.

The hydrolysate is added to the particle reactor at a rate of 52 to 54 ml in 5 minutes. The temperature is approximately isothermal at 52° C. under continuous reflux. After all the hydrolysate is added, about 150 grams of butanol is added and aged for 20 minutes. After ageing, controlled rate of aqueous ammonium hydroxide, e.g., 7% ammonium hydroxide, is added to promote condensation and particle growth. A typical rate is 3 gm/min. At this stage in the reaction, the pH is still acidic at about 3.0. An example of the particle size distribution in the early stages of ammonium hydroxide addition is shown in FIG. 7.

Figure 8:
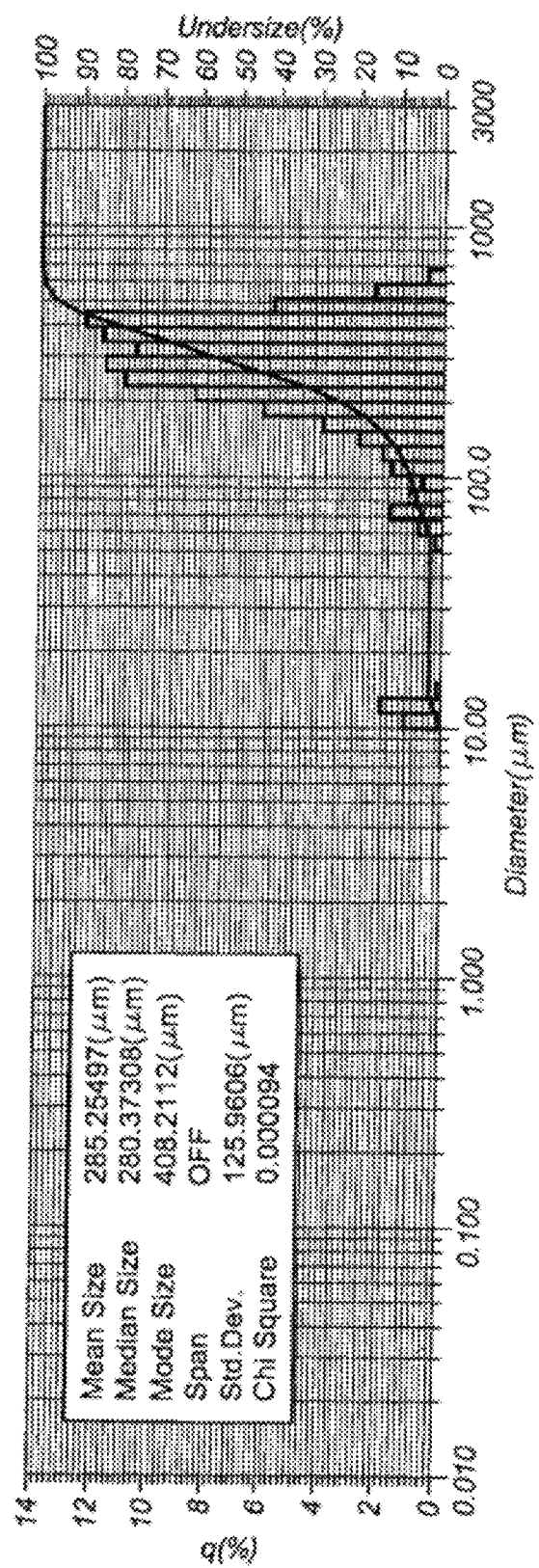
FIG. 8 shows a graph identifying the particle size distribution of high purity synthetic silica formed following the complete addition of the second catalyst in accordance with one embodiment of the method.

The ammonium hydroxide continued to be added slowly until the mean particle size is obtained as shown in FIG. 8. The final pH was about 4.0 and the condensation reaction/particle growth occurred in about 1.5 hours. The silica particles were allowed to age to a point where the particle size distribution was stabilized.

The resulting mixture was vacuum stripped to remove the organic phase, which is mostly butanol, along with the co-surfactant. The remaining water and silica was further treated with subsequent water washing to remove residual organics, mainly polyethylene glycol. In this remaining mixture, the silica yield was about 25 wt. % whereas the water was the remaining 75 wt. %. There was no need to classify the dried silica particles to obtain the desired particle size distribution. Moreover, the silica particle recovery was nearly 100% based on the amount of TMOS, unlike sol-gel techniques obtained by pulverization where there is significant amount of silica particles lost to due to classification via sieving of fines and larges.

Example 2

The following example illustrates the synthesis of titanium silicate, which may be useful, for example, as photocatalysts and in optics applications such as ultra low expansion glass for extreme UV lithography, space satellites, grated refractive index, and also for machine tool reference blocks. A particle reactor was formed as follows: 577.45 grams high purity water is added to 5.625 grams of electronic grade 1500 MW polyethylene glycol. To this, 42.1875 grams of butanol is added to form the particle reactor as shown by the presence of an emulsion. This mixture was kept at 52° C. under reflux.

A hydrolysate reactor was prepared as follows: 54.76 grams of butanol is added to 28.125 grams of water and 0.9813 grams of 37% HCl. The metal alkoxides in this example are TMOS and tetraisopropyl orthotitanate. The tetraisopropyl orthotitanate is provided as a solution comprising 20.9431 grams of tetraisopropyl orthotitanate and 271.0744 grams of butanol. The tetraisopropyl orthotitanate solution and 240 grams of TMOS are added simultaneously to the butanol/water/HCl mixture at a rate such that the addition to the hydrolysate precursor is completed in 69 minutes. After the metal alkoxides are added, a co-surfactant formed separately with 73.9113 grams of tertiary amyl alcohol and 44.775 grams of cyclohexane is added and mixed thoroughly.

Figure 9:
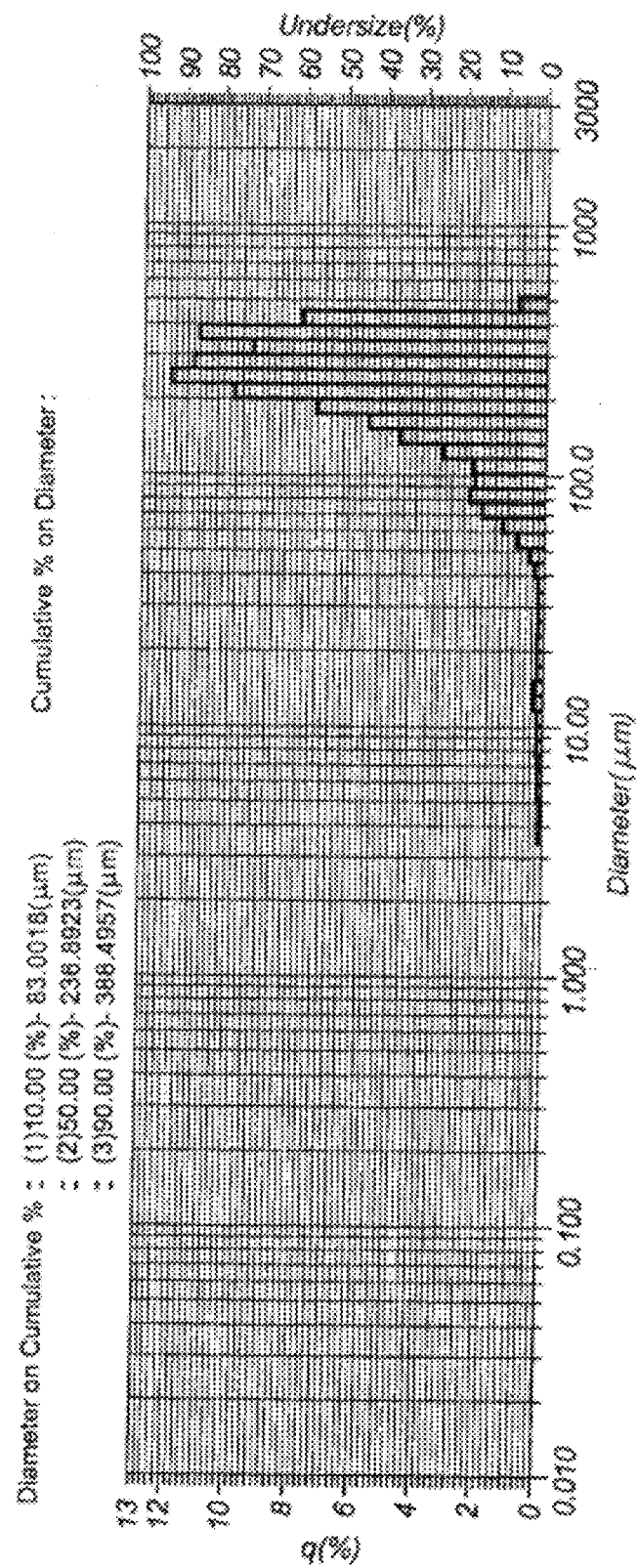
FIG. 9 shows a graph identifying the particle size distribution of high purity titanium silicate formed in one embodiment of the method.

The hydrolysate reactor is added to the particle reactor at a rate of 13.93 grams per minute; the particle reactor agitator is set at 205 RPM. After all the hydrolysate is added, about 169 grams of butanol is added. The temperature is approximately isothermal at 52° C. under continuous reflux. After equilibration, a 0.5% solution of aqueous ammonium hydroxide is added at a controlled rate to promote condensation and particle growth and the mixture is agitated (the speed of the particle reactor agitator being increased to 240 RPM) to obtain titanium silicate particles. FIG. 9 illustrates the particle size distribution of the titanium silicate obtained in Example 2. As shown in FIG. 9, the particles have a near unimodal particle size of 237 microns.

Example 3

The following example illustrates the synthesis of methylated silica having a relatively narrow particle size distribution, which may be useful for applications in cosmetics and as light diffusers for flat panel screens.

A particle reactor was prepared as follows: 1016.028 grams of water is added to 25.857 grams of 300 MW polyethylene glycol. To this, 38.025 grams of butanol is added to form the particle reactor as shown by the presence of an emulsion. This mixture was kept at 56° C. under reflux.

A hydrolysate reactor was prepared as follows: 45.63 grams of butanol is added to 17.49 grams of water and 0.5628 grams of 37% HCl. The silicon alkoxide in this example is a mixture prepared from 1.35 moles of methyltrimethoxysilane and 0.14 moles of tetramethylsiloxane. The silicon alkoxide composition is added to the hydrolysate reactor such that the solid loadings of the final methylated silica are about 7.33% of the final batch (in the particle reactor). The silicon alkoxide mixture is added to the hydrolysate reactor in 34 minutes and the hydrolysis is kept at adiabatic conditions under vigorous mixing. The hydrolysate was allowed to cool to room temperature and then 114.08 grams of tertiary amyl alcohol and 38.03 grams of cyclohexane were added, mixed thoroughly, and aged for several minutes.

Once aged, the hydrolysate was fed to the particle reactor at a rate of 22.73 grams per minute with constant agitation using a 4-blade, 45° pitch agitator at 360 RPM. At the end of the hydrolysate feed, 150 grams of butanol was added to the particle reactor, which was kept at 56° C. under reflux. Once the temperature was equilibrated, a 0.37% solution of ammonium hydroxide was slowly added to the particle reactor until the desired particle size is obtained.

Figure 10:
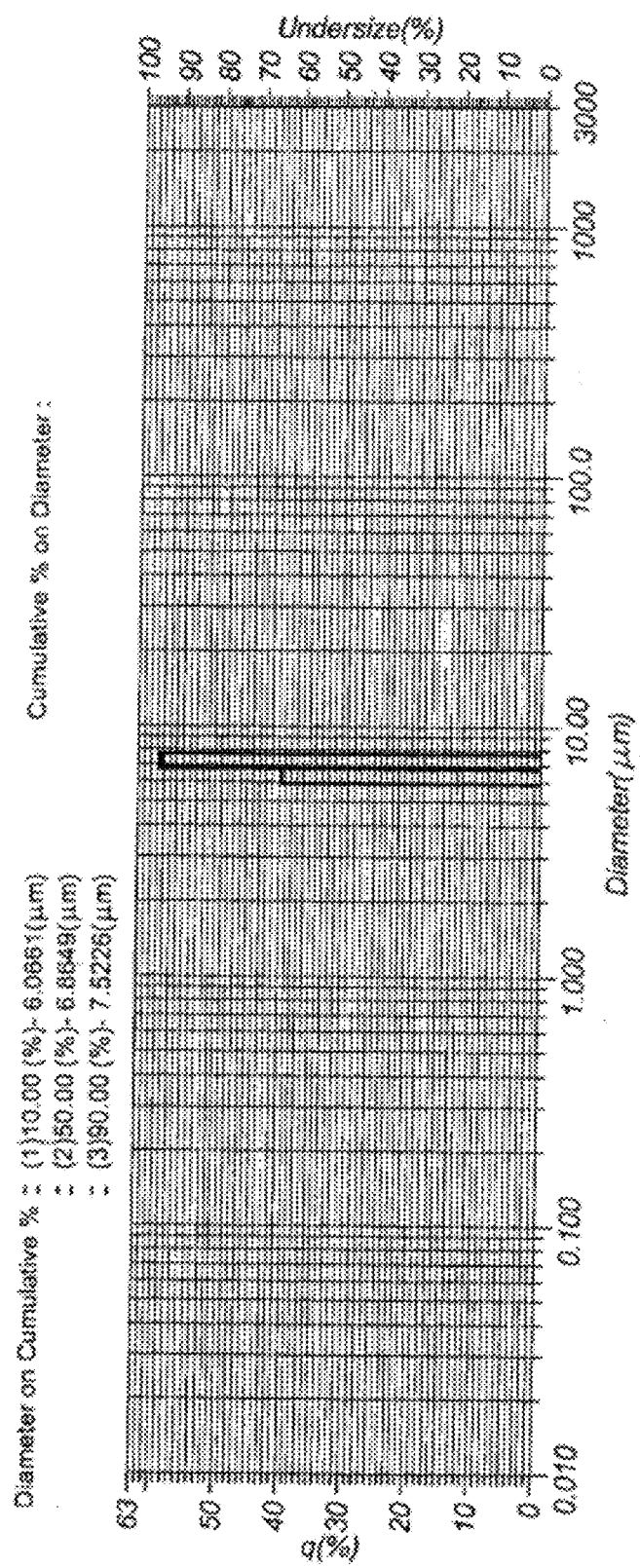
FIG. 10 shows a graph identifying the particle size distribution of high purity methylated silica early during the addition of a second catalyst in one embodiment of the method.
Figure 11:
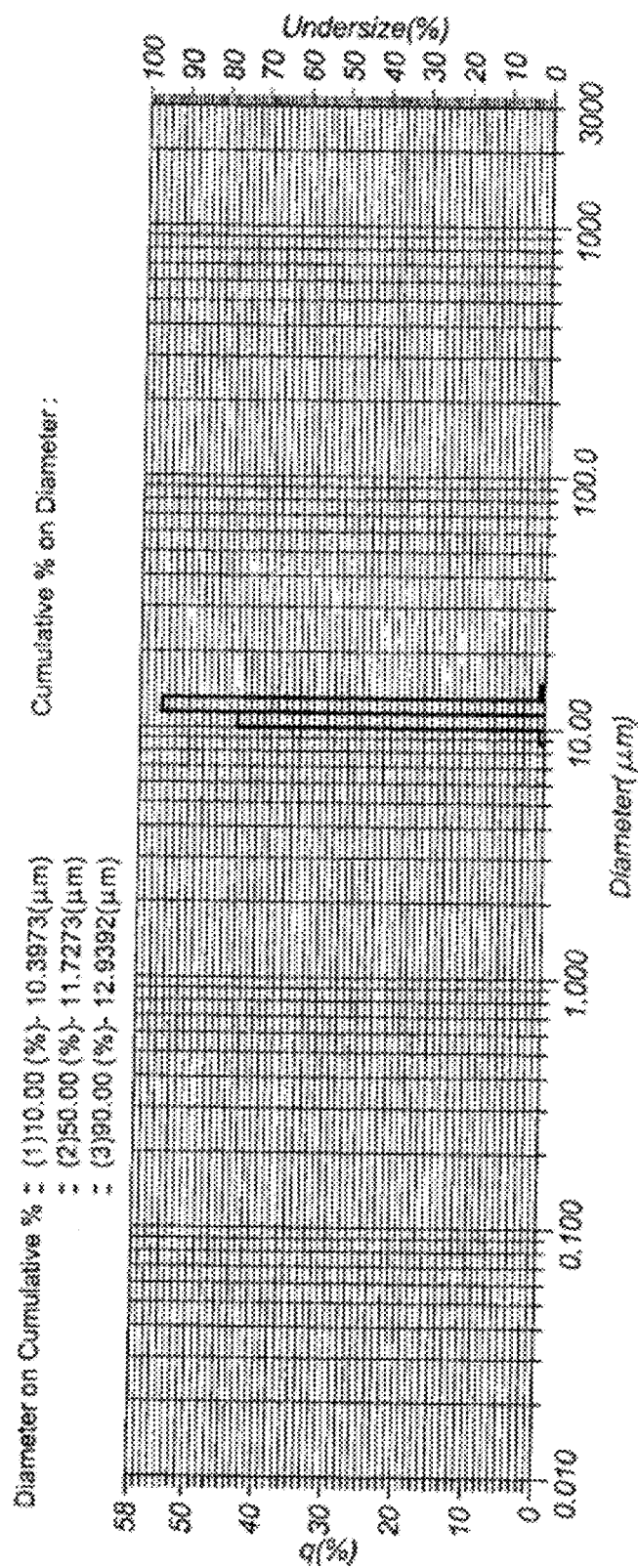
FIG. 11 shows a graph identifying the particle size distribution of high purity methylated silica following the complete addition of the second catalyst in accordance with one embodiment of the method.

FIG. 10 shows the particle size distribution after 33 minutes of adding the butanol. As shown in FIG. 10, the particles had a mean particle size of 6.8 microns. FIG. 11 shows the particle size distribution after the reaction was completed (after about 118 minutes). As shown in FIG. 11, the particles had an average particle size of 11.73 microns. The final particles had a near uniform particle size and a narrow particle size distribution (with a standard deviation of only 0.81 microns).

Example 4

500.8 gms of tetramethylorthosilicate is added to a mixture of 113.9 gms of butanol, 56.5 gms of water and 1.93 ml of concentrated HCl. The rate of addition is such that in an adiabatic reactor, the maximum adiabatic rise is to about 72° C. in 20 minutes. The hydrolysate is allowed to equilibrate to about 30° C. To this resulting hydrolysate is added a co-surfactant system composed of 153.5 gms of tertiary amyl alcohol and 93.1 gms of cyclohexane and the mixture is allowed to equilibrate. Thereafter, this hydrolysate is added to a particle reactor composed of 781.6 gms of water, 87.75 gms of butanol and 11.7 gms of 1500 MW polyethylene glycol. The rate of addition is about 12 gms per min at controlled temperature of 52° C. After the hydrolysate is fed into the particle reactor about 29.5 gms of butanol is added and allowed to equilibrate. Subsequently a 0.5% ammonium hydroxide is added to the particle reactor at a rate of 4 gms per minute and stopped when a suitable particle size distribution was obtained. The pH at the end of base addition was 2.5 and showed partial gel formation. Nevertheless, an average particle size of 283.1 micron was achieved. The slurry was stripped off the organics until about 500 gms of overhead was collected. The stripping was done at −4 psig and 62° C. A sequence of 2 acetone washes was conducted after the organic stripping. The amount of acetone used is about twice the weight of the wet silica slurry. A final water rinse was also used. The acetone wash was at 63° C. under reflux. The result of these acetone washes is shown below as ppm carbon on a dried silica basis using a UIC carbon analyzer model CM-5414 operating at 900 C:

| Washing Step | Carbon (ppm) |
| --- | --- |
| No Wash | 99 |
| 1st Acetone Wash | 79 |
| 2nd Acetone Wash | 31 |

Example 5

535.1 gms of tetramethylorthosilicate is added to a mixture of 121.7 gms of butanol, 62.5 gms of water and 2.06 ml of concentrated HC1. The rate of addition is such that in an adiabatic reactor, the maximum adiabatic rise is to about 72° C. in 20 minutes. The hydrolysate is allowed to equilibrate and cool to about 30° C. To this resulting hydrolysate is added a co-surfactant system composed of 174.1 gms of tertiary amyl alcohol and 99.51 gms of cyclohexane and the mixture is allowed to equilibrate. Thereafter, this hydrolysate is added to a particle reactor composed of 835 gms of water, 93.75 gms of butanol and 16.7 gms of 1500 MW polyethylene glycol. The rate of addition is about 12 gms per min at controlled reactor temperature of 52° C. At the end of the hydrolysate feed step, about 300 gms of butanol is added and allowed to equilibrate. A 0.5% ammonium hydroxide solution is added to the particle reactor for growth at a rate of 4.4 gms per minute and stopped when a suitable particle size distribution was obtained. The pH at the end of base addition was 2.5 and does not show partial gellation. An average particle size of 395 microns was achieved.

Figure 12:
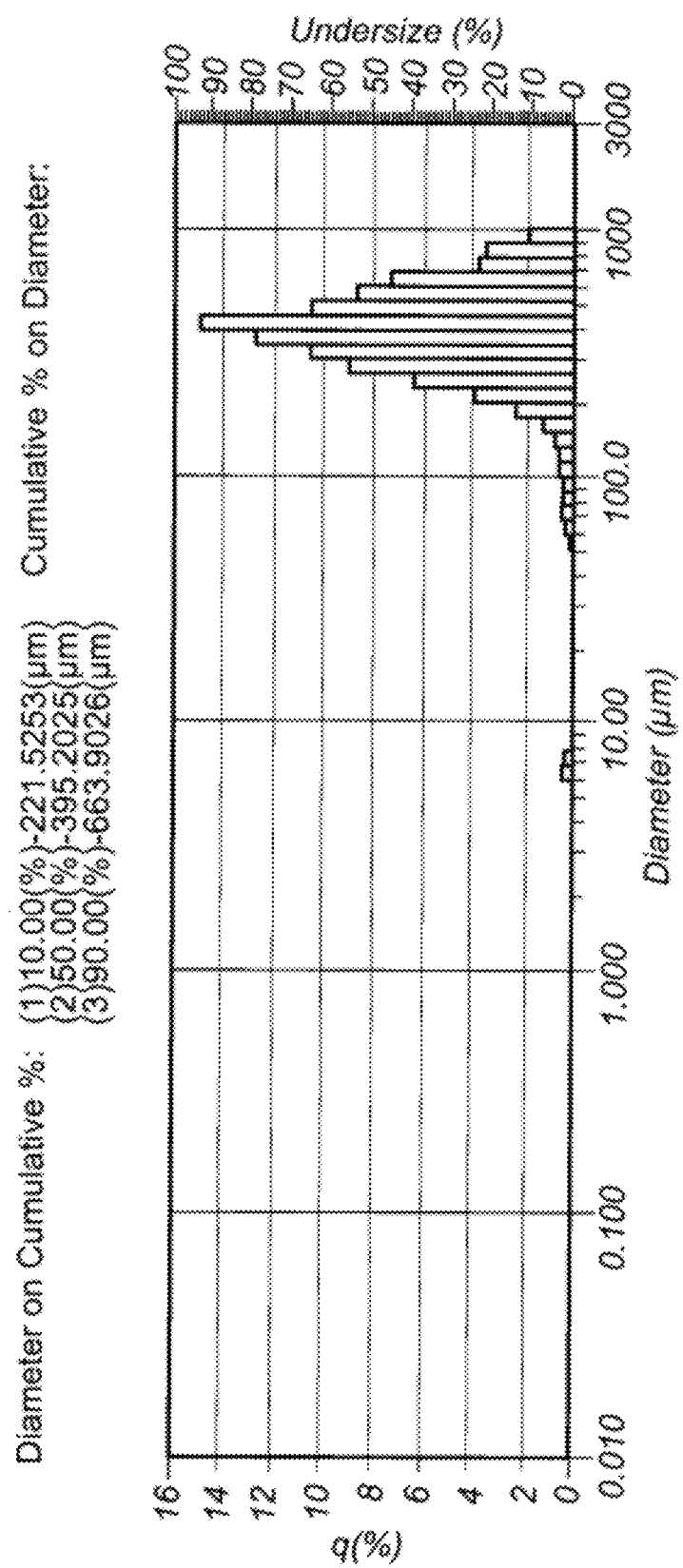
FIG. 12 shows a graph identifying the particle size distribution of high purity titanium silicate formed in one embodiment of the method.

The particle size distribution is shown on FIG. 12. The yield of tetramethylorthosilicate (TMOS) to silica is 100% with a particle yield of about 87.3% in the size range of 60 to 600 microns.

Example 6

535.1 gms of tetramethylorthosilicate is added to a mixture of 121.7 gms of n-pentanol, 62.5 gms of water and 2.06 ml of concentrated HC1. The rate of addition is such that in an adiabatic reactor, the maximum adiabatic rise is to about 72° C. in 76 minutes. The hydrolysate is allowed to equilibrate and cool to about 30° C. To this resulting hydrolysate is added a co-surfactant system composed of 174.1 gms of tertiary amyl alcohol and 99.5 gms of cyclohexane, and the mixture is allowed to equilibrate. Thereafter, this hydrolysate is added to a particle reactor composed of 835 gms of water, 93.75 gms of n-pentanol and 15.3 gms of 1500 MW polyethylene glycol. The rate of addition is about 12 gms per min at a controlled reactor temperature of 52° C. At the end of the hydrolysate feed step, about 300 gms of butanol is added and allowed to equilibrate. A 0.5% ammonium hydroxide is added to the particle reactor at a rate of 4.4 gms per minute and stopped when a suitable particle size distribution was obtained. The pH at the end of the base addition was 1.950 and does not show partial gellation.

The slurry was stripped of nearly all the organics under vacuum of about −11 psig and 60° C. This was followed by two acetone washes at its normal boiling point and then a final cold water rinse. This material is dried in a rotary drier and calcined in a fluid bed to yield 0.47 ppm inorganic carbon.

Figure 13:
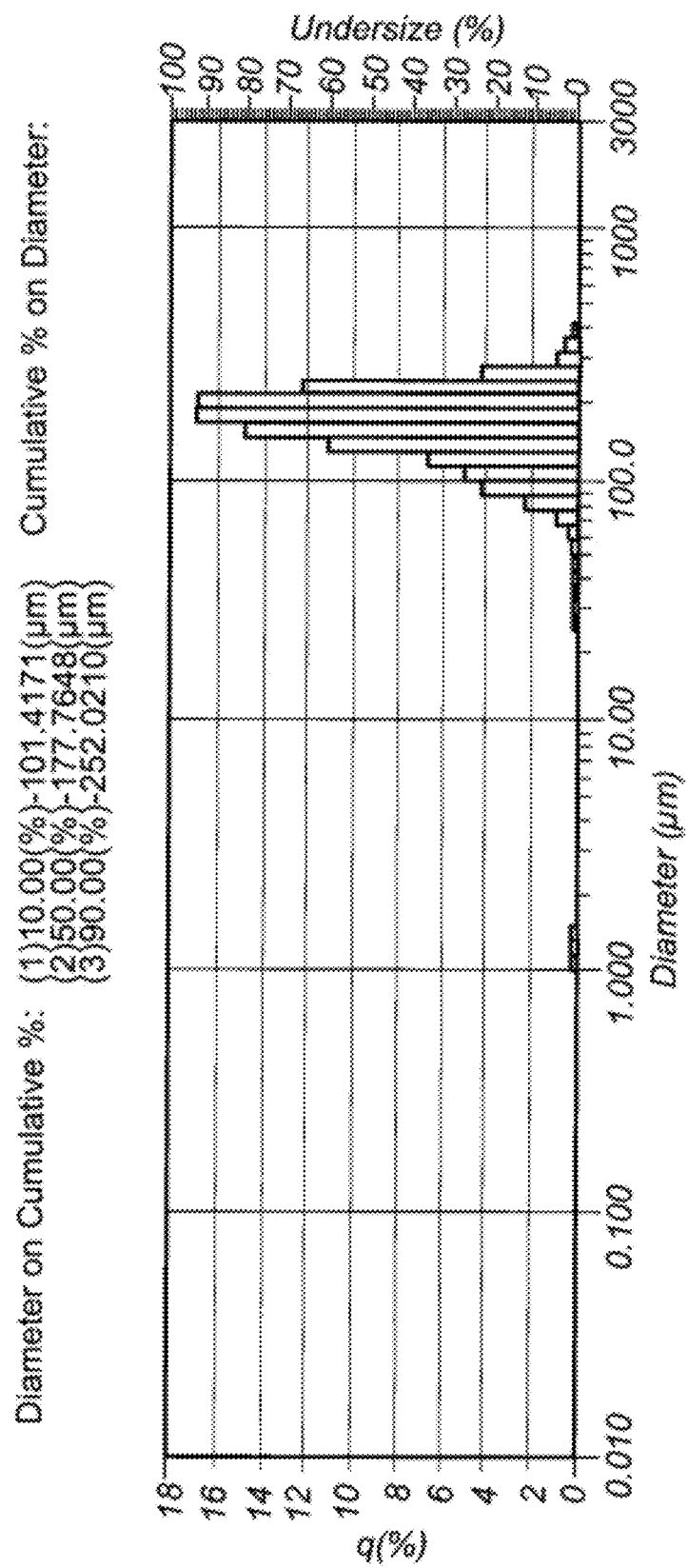
FIG. 13 shows a graph identifying the particle size distribution of high purity titanium silicate formed in one embodiment of the method.

The particle size distribution is shown in FIG. 13. In the 70 to 350 micron range, the yield is 93.8% on a 100% conversion of TMOS to silica.

Example 7

Figure 14:
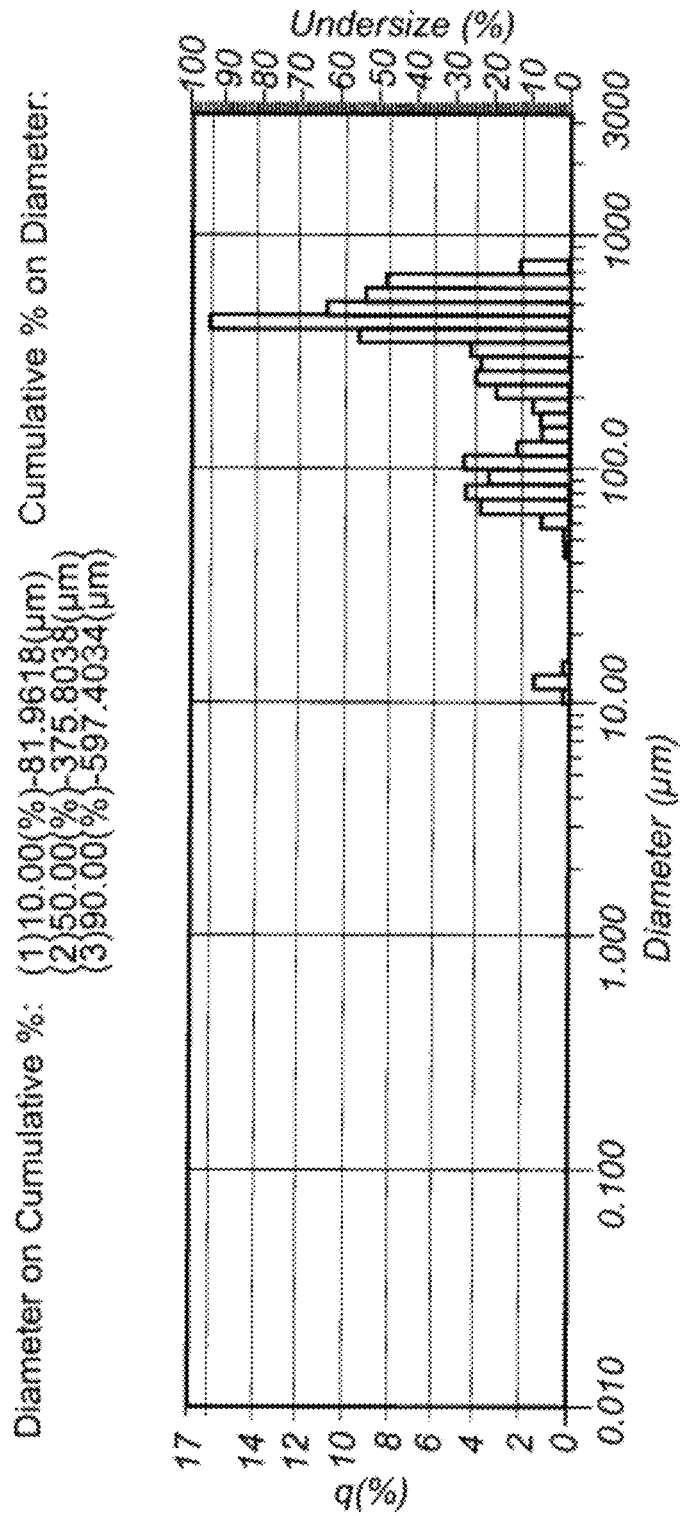
FIG. 14 shows a graph identifying the particle size distribution of high purity titanium silicate formed in one embodiment of the method.

535.1 gms of tetramethylorthosilicate is added to a mixture of 121.7 gms of n-pentanol, 62.5 gms of water and 2.06 ml of concentrated HCl. The rate of addition is such that in an adiabatic reactor, the maximum adiabatic rise is to about 77° C. in 75 minutes. The hydrolysate is allowed to equilibrate and cool to about 30° C. To this resulting hydrolysate is combined with a co-surfactant system composed of 174.1 gms of tertiary amyl alcohol and 99.75 gms of cyclohexane and the mixture is allowed to equilibrate. Thereafter, this hydrolysate is added to a particle reactor composed of 835 gms of water, 93.75 gms of n-pentanol and 15.3 gms of 1500 MW polyethylene glycol. The rate of addition is about 12 gms per min at controlled particle temperature of 52° C. At the end of the hydrolysate feed, about 300 gms of butanol is added and allowed to equilibrate. A 0.5% ammonium hydroxide is added to the particle reactor at a rate of 4.4 gms per minute and stopped when a suitable particle size distribution was obtained. The pH at the end of base addition was 2.1 and does not show partial gellation. In this case, a large particle size with bimodal distribution is obtained. The particle size distribution is shown in FIG. 14.

Two acetone washes were conducted after the material was stripped of organics at 75° C. The stripping is stopped when most of the n-pentanol is removed. The residual inorganic carbon is 48.4 ppm after 2 acetone washes with water washes in between the acetone wash. This was subsequently calcined using a continuous pure oxygen flow and the dried silica gel is fluidized. The calcination is conducted by ramping the temperature to 300° C. in 10 minutes and holding it at 300° C. for 2 hours. Thereafter, the temperature is ramped to 950° C. at 1° C./min. Once the temperature hits 950° C., the gas is switched to helium and the temperature is ramped again to 1230° C. The gas flow used is such that a good fluidization of the silica is obtained.

The residual inorganic carbon after calcination is 1.37 ppm. This material is later vacuum fused to produce a glass article.

Example 8

To an 4 liter of silica-water slurry that has been stripped of organics as generated by this process in Example 1 prior to the water washing step, 3 liters of high purity acetone is added and the agitator is set at 140 RPM. To this, another 3 liters of high purity water is added. The resulting silica-water slurry is heated to 75° C. and the condensate collected in a distillate receiver flask. The silica-water slurry volume is allowed to drop to ~8 liters and is then maintained by continuous addition of high purity water. This first stripping is completed when the amount of the overhead distillate starts to level off or when 2 liters of overhead distillate is collected. At completion, 3 liters of high purity water is added, the particles allowed to settle, and the supernatant decanted to approximately 4 liters of slurry. The level of organics within the particle is then determined by GC/MSD with acetonitrile extraction of the silica. If the level of organics, e.g., methanol, butanol, cyclohexane and tertiary amyl alcohol is yet detectable, further stripping will be required.

In a second stripping, 2 liters of high purity acetone is added and 4 liters of high purity water is added. This silica slurry is stripped at 85° C. and the volume is allowed to drop to approximately 8 liters and is then maintained by continuous addition of high purity water. The end point of stripping is determined when the overhead distillate receiver starts to level off or when 2 liters of overhead distillate is collected. At completion, 3 liters of high purity water is added, the particles allowed to settle, and the supernatant decanted to approximately 4 liters of slurry. The silica is again analyzed for the level of organics via GC/MSD extraction of the silica. If the level of organics is yet detectable, further stripping will be required.

In a third stripping, 1 liter of high purity acetone is added and 4 liters of high purity water is added to the silica slurry. Stripping is conducted at ~100° C. and the volume is allowed to drop to approximately 8 liters and is then maintained by the continuous addition of high purity water. Typical end point for this stripping is when 8 liters of overhead distillate is collected. The silica is analyzed for organics by GC/MSD and if the level of organics is yet detectable another stripping is conducted similar to this third stripping. Typically, at the fourth stripping the end point is achieved as seen in the table below. In the table below a ND represents non-detection of a peak—no signal observed above the detection limit of the GC-MS equipment.

| Stripping Sequence | Relative Area Percent | | | |
| --- | --- | --- | --- | --- |
| | MeOH | BuOH | TAM | Cyclohexane |
| 1 | 5.79 | 2.582 | ND | ND |
| 2 | 2.862 | 0.714 | ND | ND |
| 3A (~100 C.) | 0.102 | ND | ND | ND |
| 4 | ND | ND | ND | ND |

Embodiments of the invention have been described above and, obviously, modifications and alterations will occur to others upon the reading and understanding of this specification, including altering the identity of the metal alkoxide source to produce other metal oxide particles. The claims as follows are intended to include all modifications and alterations insofar as they come within the scope of the claims or the equivalent thereof.

What is claimed is:

1. A method for producing porous metal oxide, metal hydroxide, metal carbonate, sulfate or metal oxalate particles, the method comprising:
    forming metal oxide, hydroxide, carbonate, sulfate, or oxolate particles from an alkoxide or organometallic material wherein the method of forming the particles comprises;
    (i) mixing a first solution comprising an organometaloxo oligomer with a second solution comprising, water, a surfactant, and an alcohol to form a first mixture;
    (ii) adding a phase enhancer to the first mixture to form a second mixture;
    (iii) adding a catalyst to the second mixture to form the metal particles; and
    (iv) removing residual organic materials in the particles by treating the particles with water, at least one aprotic solvent, or a combination thereof via stripping, washing, or a combination thereof.

2. The method of claim 1, wherein removing residual organic materials in the particles comprises treating the particles from step (iii) with an aprotic solvent.

3. The method of claim 2, wherein subsequent to formation of the particles in step (iii) and prior to and/or after treating the particles in step (iv), the method further comprises heating the particles at about 20° C. to about 110° C. and stripping organic material from the particles under pressures of from −13 psig to +0.5 psig with or without gas sparging.

4. The method of claim 2 comprising heating the particles for a first period of time prior to the treating operation (iv), and subsequently stripping organic material from the particles by adding water to the system and heating the particles to between 20° C. and 110° C. sufficient to facilitate the removal of organic material from the particles.

5. The method of claim 2, wherein treating with the aprotic solvent comprises:
    (a) rinsing the particles with the aprotic solvent to remove organic material from the particles;
    (b) decanting the aprotic solvent carrying the organic material; and
    (c) repeating (a) and (b) until the particles have a desired level of hydrocarbon material.

6. The method of claim 5 comprising washing the particles with water between successive rinsings with the aprotic solvent.

7. The method of claim 2, wherein treating the particles with the aprotic solvent comprises adding water and the aprotic solvent to the particles, and heating the particles to remove a majority of the residual organic material, a majority of the aprotic solvent, and at least a portion of the water.

8. The method of claim 7, wherein treating the particles with the solution of water and the aprotic solvent and heating the particles are each performed two or more times until a desired residual hydrocarbon level is obtained.

9. The method of claim 1, wherein the aprotic solvent is chosen from acetone, dimethyl ether, dichloromethane, tetrahydrofuran, dimethylformamide, acetonitrile, dimethyl sulfoxide, ethyl acetate, or a combination of two or more thereof.

10. The method of claim 1, where removing residual organic materials in the particles comprises treating the particles from step (iii) with water.

11. The method of claim 2, wherein subsequent to treating the particles with the aprotic solvent, or as part of the process, one or more of the solutions formed during the process are regularly decanted in order to remove surfactants and higher alcohols from the solution.

12. The method of claim 1 comprising treating the particles with the aprotic solvent at a temperature of from about 20 to about 110° C.

13. The method of claim 1 comprising treating the particles with an aprotic solvent two or more times.

14. The method of claim 2 further comprising curing the particles prior to treating with the aprotic solvent, wherein curing comprises ageing the particles, heating the particles, or heating and ageing the particles.

15. The method of claim 2 further comprising:
(v) thermally treating the particles to calcine and/or densify the particles.

16. The method of claim 1 comprising densifying the particles with or without a prior calcining treatment.

17. The method of claim 1, wherein the organometaloxo oligomer comprises a metal chosen from Si, Ti, Fe, Al, Zr, Nb, Y, Mg, Mn, Co, Ni, Cu, V, Ce, alkaline metals, alkaline earth metals, rare earth metals, or a combination of two or more thereof.

18. The method of claim 1, wherein the organometaloxo oligomer is a polyalkoxysiloxane, and the first solution is prepared by at least partially hydrolyzing a silicon alkoxide to form a polyalkoxysiloxane; and
the first mixture is formed by combining the polyalkoxysiloxane with water, a first surfactant, a first alcohol, and a second catalyst.

19. The method of claim 18, wherein the first second catalyst can be an acid or a base.

20. The method of claim 18, wherein the water to polyalkoxysiloxane molar ratio is from about 0.25 to about 4.

21. The method of claim 18, wherein the first catalyst can be a base catalyst chosen from an organic base, an inorganic base, or a combination of two or more thereof.

22. The method of claim 21, wherein the first catalyst comprises ammonia hydroxide.

23. The method of claim 18, wherein the polyalkoxysiloxane comprises from about 4 to about 20 Si—O units.

24. The method of claim 1 further comprising recycling the organic material that has been collected by stripping, decanting, washing with or without additional purification, separating the organic material, and supplying the organic material back into a metal alkoxide generation or particle formation generation operation.

25. The method of claim 2 wherein subsequent to treatment of the metal oxide particles with the aprotic solvent, the aprotic solvent is separated from the particles and recycled for a subsequent washing operation.

26. A method for producing high purity porous metal oxide, metal hydroxide, or carbonate particles with a surface area between 150-1200 $m^2$/g and/or a metal impurity of about 50 ppb or less for each metal impurity, the method comprising forming metal oxide, hydroxide, carbonate, sulfate, or oxolate particles from an alkoxide or organometallic material wherein the method of forming the particles comprises, mixing a first solution comprising an organometaloxo oligomer with a second solution comprising, water, a surfactant, and an alcohol to form a first mixture, adding a phase enhancer to the first mixture to form a second mixture, adding a catalyst to the second mixture to form the metal particles, and removing residual organic materials, including alcohols generated from the alkoxides, in the particles by treating the particles via stripping, washing, or a combination thereof, the treating of the particles using water, at least one aprotic solvent, or combinations thereof.

* * * * *